US007343567B2

(12) United States Patent
Mann et al.

(10) Patent No.: US 7,343,567 B2
(45) Date of Patent: Mar. 11, 2008

(54) SYSTEM AND METHOD FOR PROVIDING DYNAMIC USER INFORMATION IN AN INTERACTIVE DISPLAY

(75) Inventors: Justin Mann, Redmond, WA (US); Charles Cummins, Seattle, WA (US); Fabrice A. Debry, Bellevue, WA (US); David A. Matthews, Seattle, WA (US); Hillel Noah Cooperman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 10/423,597

(22) Filed: Apr. 25, 2003

(65) Prior Publication Data

US 2004/0212640 A1 Oct. 28, 2004

(51) Int. Cl.
*G06F 3/48* (2006.01)
(52) U.S. Cl. .................. 715/826; 715/815; 715/825; 715/811
(58) Field of Classification Search ............ 715/810, 715/811, 815, 825, 826, 779, 801, 800, 715
See application file for complete search history.

(56) References Cited

U.S. PATENT DOCUMENTS 5,644,737 A * 7/1997 Tuniman et al. ............ 715/810
5,659,693 A * 8/1997 Hansen et al. ............. 715/779
6,072,486 A * 6/2000 Sheldon et al. ............ 715/835
6,983,424 B1 * 1/2006 Dutta ......................... 715/800
2002/0186257 A1 * 12/2002 Cadiz et al. ............... 345/838
2004/0261036 A1 * 12/2004 Vedbrat et al. ............. 715/779

OTHER PUBLICATIONS

Microsoft, Microsoft Internet Explorer, 2001, Microsoft Corp., attached screen shots representing actual functionality of the software used in 2001 MSFigures 1-11.*

* cited by examiner

*Primary Examiner*—John Cabeca
*Assistant Examiner*—Dennis G. Bonshock
(74) *Attorney, Agent, or Firm*—Birch, Stewart, Kolasch & Birch, LLP

(57) ABSTRACT

The present invention is directed to a method and system for use in a computing environment to present and provide access to information that a user cares about. A scheme is provided for presenting frequently used controls and information in tiles within a sidebar. Tiles are hosted individually or in groups, within a sidebar, for interaction by a user. Tiles can be added or removed from the sidebar automatically or by user request. The present invention is further directed to a method for providing a scaleable and useable preview of tiles within a sidebar. Further still, the present invention is directed to maintaining an overflow area of icons for tiles that would not fit within the sidebar. The sidebar has content that dynamically adjusts in response to the addition, expansion, squishing or removal of tiles. Even Further, a user can customize the sidebar of the present invention.

59 Claims, 23 Drawing Sheets

SYSTEM AND METHOD FOR PROVIDING DYNAMIC USER INFORMATION IN AN INTERACTIVE DISPLAY

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to computing environments. More particularly, the invention is to directed to a system and method for presenting information for selection and interaction by end users. The present invention displays tiles of controls, status and application interfaces within a dynamic area of a display screen.

BACKGROUND OF THE INVENTION

In today's information saturated environments, such as the Internet, a local or remote computer network, or any combination of the Internet and such networks, it is often difficult for a user to keep track of the potentially large amounts and variety of communications and information in which the user may be interested. Such communications and information include, for example, email, instant messaging, file transfers, local weather, appointments, schedules, personal contacts, statistical information, file status, stock quotes, sports scores, local traffic, or any other type of communications or information that may be of interest to the user. This problem becomes particularly acute where the communications and/or information are dynamic, such that rapid, numerous, or large changes to the communications status or channels, or in the information of interest to the user results in out of date communications and/or information that is often relatively useless to a user.

In response to this problem, several conventional schemes have been developed to assist users in attempting to keep track of specific communications or information without requiring a user to manually search out or manually check for updates to the communications or information each time the user wants to examine the communications or information. However, such schemes are typically limited by what types of communications or information can be tracked or displayed, by the manner in which the communications or information is accessed or otherwise provided to the user, or by the inability to facilitate sharing of the communications or information between users. Further, conventional schemes that have attempted to address these problems tend to be limited by an inability to provide a single interface that allows for concurrent information retrieval, display or access in combination with communications and communication access points in a dynamic integrated environment. Consequently, users are often left with cluttered displays, which provide access or interaction with either particular types of communications, or with specific information, but not with both communications and information access and interaction in an integrated environment.

Several conventional messaging type schemes have attempted to partially address some of these problems. However, such schemes typically provide relatively large windows that take up substantial amounts of screen or display real estate. Further, such schemes, while providing some communications capabilities along with some information gathering or display capabilities, tend to separate the communications capabilities from the information capabilities via one or more tabs or the like. Consequently, particular information cannot be easily shared or communicated from within the applications provided by these schemes. Further, such schemes become unwieldy as the amount of information being tracked by a user increases, and as the number of communications contacts maintained by the user increases. In particular, as the amount of contacts and/or information increases, the user is forced to scroll through large amounts of data or communications channels to find what he or she is looking for.

For example, several conventional messaging type schemes provide similar capabilities for keeping track of or watching information, such as stock quotes, weather, news, or other information via the Internet or some other local or remote network, or some combination thereof. Further these conventional schemes also provide for some sort of communications access such as, text instant messaging, file transfer, email, etc., via one of a number of communications channels for contacts in one or more groups of contacts. Consequently, a user is able to keep track of particular information of interest, as well as to communicate with particular people or entities. Unfortunately, with these schemes, the user cannot do both simultaneously. He is forced to tab between the different types of information and the communications capabilities. Therefore, the user is unable to share data observed via the different information tabs with contacts in the communications tab unless the user manually saves or copies the information, switches tabs, then manually creates a message to a particular contact, and either attaches or pastes the information to that message.

Further, because these conventional schemes tend to have a number of tabs, they require a fairly large window in order to display the information and associated controls or icons. Unfortunately, such windows tend to get buried under other application windows when the user is using other applications. Consequently, the user is often forced to interrupt his or her flow of work to switch between windows. This particular problem has been addressed by some of these schemes by providing an option to always keep the message window on top. Consequently, while solving the problem of burying the messaging window, a new problem is created. Specifically, the messaging window then occludes a potentially large part of any other open application window. While it is possible to manually resize the different application windows and to move them around the screen in an attempt to give each window its own space, such manual user intervention can be both time consuming and aggravating for the typical user.

At least one conventional scheme has attempted to address some of the problems of the aforementioned schemes. For example, one conventional scheme provides an application that allows a user to customize at least one icon in a scrollable strip along one edge of a computer display device. This scheme provides iconized links to particular information sources, and uses conventional techniques to populate each customized icon with information retrieved from the information sources. However, this scheme has several important limitations.

In particular, while this scheme provides for gathering and providing information to a user, it fails to provide the level of communications capabilities offered by the aforementioned messaging schemes. For example, this scheme does not provide a means for initiating communication via an icon, so while an icon may provide a communication status, such as a number of received messages, it does not provide a means for responding to such messages. Further, this scheme does not provide for nesting or otherwise organizing groups of icons in order to aggregate multiple icons. In other words, opening the window associated with one icon does not provide access to further levels of grouped icons. Consequently, it is difficult to organize icons where a large number of icons are used. In addition, the icons of this scheme are not easily transportable. In other words, there is no real mechanism for transferring icons between users. Instead, users are required to obtain the icons from an application used for managing the icons. Other limitations of this scheme include a lack of an ability to resize the window containing the scrollable strip used for displaying the icons. Further, with this scheme, if a user adds too many items, another row or strip is automatically created within the window, even if that row has only one icon. Consequently, this scheme can potentially cause a large waste of valuable display space.

A related scheme allows a user to customize a scrolling ticker type display window to provide continuously updated scrolling information from a predefined set of available information. While useful, this scheme is even more limited than the prior scheme for several reasons. Most important among these limitations is that the set of information that is available to this scheme is predefined. Thus, if the information type and source is not listed as an option with this scheme, it is simply not available. However, users are provided with limited control over certain information options, such as, for example, specific stock symbols for stock quotes, choosing areas or topics of news to generate an automatic alert, or choosing particular cities to generate a weather report. Another limitation is that users are not able to add or edit information sources, such as by modifying the icons as described above. Further limitations of this scheme include that fact that since the ticker scrolls, there is no guarantee that all the information of interest will be visually available at any given time. Specifically, if the information of interest to a user is not currently visible, the user must wait until the information scrolls into view. Consequently, such a scheme can become very distracting to the user as the user is forced to direct a large amount of attention to the display in order to retrieve desired information. Further, because the scrolling ticker is in constant motion, it is in itself potentially very distracting to a user as it creates a persistent motion in the user's peripheral vision. Finally, the communications capability of this scheme is virtually non-existent in comparison to the aforementioned messaging schemes.

Still other schemes for providing custom information views or displays involve a technique known as "web scraping." In general, such schemes allow a user to specify particular portions of unique Internet Web pages, i.e., source web pages, to be displayed on a single customized web page. Consequently, while such schemes provide for information retrieval and display, they do not provide for communications capability.

For example, one web scraping scheme allows users to "clip" relevant data and content from various Internet web sites and pull it all together in one dynamic browser page, called a "view." This view is effectively a composite web page. Thus, as any of the source web pages are changed, the composite web page is automatically updated. Further, this scheme allows users to edit views in a variety of ways, such as by adding, deleting and rearranging data elements and personalizing the view with the user's own inputs. In addition, this scheme provides a method for transferring views between users. However, this scheme suffers from many of the same basic limitations described above with respect to the aforementioned schemes. Such limitations include an inability to nest or organize views, or to arrange for a plurality of views to be displayed simultaneously. Also, as mentioned above, such schemes typically provide little or no communications or messaging capabilities.

Further limitations of web scraping include the fact that the views of this scheme must be opened in a window that typically takes up a substantial portion of a display device, if not the entire display device, and thus, it cannot provide an unobtrusive method for providing information to the user. In addition, typical web pages, as well as specific content of those web pages, are typically not designed to minimize the area in which information is displayed. In other words, such web pages and content are simply not designed with the idea of squeezing lots of important information into very small spaces. Consequently, the end result of web scraping is a composite web page that tends to be a very inefficient use of screen space. Further, if a portion of the web page that is scraped or otherwise clipped from an existing web page includes an animation, the web page can be very distracting if it's in the user's peripheral vision. Finally, because the web scraping technique is effectively a patchwork of distinct elements, the composite web page resulting from such techniques is typically an unappealing jumble of disparate elements that were never visually designed to appear together on a single page.

In some instances, a user may want to be aware of real-time information and notifications. Conventional user interface systems do not provide a solution that addresses both of these needs, while also providing the user with flexibility, ease of use, and choice in configuration. A notification or real-time window will traditionally take up part of the user's viewing real estate and in some instances will cause the user have to arrange display windows.

Even further, users frequently need to use controls or other application interfaces that are independent of their current task. In those cases, a user has to switch from their current task window to another window or application in order to use the needed control or interface. For example, if a user was using a word processing package and wanted to change a compact disk track or other such task, the user will need to access the controls of a media player application program, which typically is displayed in a different window. An example of this is the WINDOWS MEDIA PLAYER in an environment such as the Window Operating System.

Consequently, what is needed is a new system and process for automatically providing dynamic communication access and information awareness in an interactive peripheral display without requiring a user to tab between communications channels or information types. Further, such a system and process should not require a user to choose from a predefined list of communication access points and information categories or sources, but instead should allow for creation and customization of communications access points and information sources. Such communications access points should include communications channels for contacting other entities, and the display of information from multiple applications. The information sources should include any desired information elements, such as, for example, specific information types, information categories, or information sources. In addition, this system and process should allow users to customize and aggregate or organize any desired communication channels or access points, or any desired information sources into any desired number of groups or nested groups. Also, these groups or nested groups should be capable of being expanded by the user to allow the user to view nested groups or communication access points or information elements within these groups or nested groups. Finally, this system and process should reduce clutter and increase consistency in the user display, while providing live information that users care about, and a platform for frequently used controls.

BRIEF SUMMARY OF THE INVENTION

The present invention is directed to a method and system for use in a computing environment to present and provide access to information of interest to a user. A scheme is provided for presenting frequently used controls and information.

In one aspect, the present invention is directed to hosting tiles individually or in groups, within a sidebar, for interaction by a user. Tiles can be added or removed from the sidebar automatically or by user request. Tiles provide quick, convenient and consistent access to both live and static information. In addition, tiles provide notification to users.

In another aspect, the present invention is directed to a method for providing a scaleable and useable preview of tiles within a sidebar.

In yet another aspect, the present invention is directed to maintaining an overflow area of icons for tiles that do not fit within the sidebar.

In a further aspect, the present invention is directed to a sidebar that has content that dynamically adjusts in response to the addition, expansion, squishing or removal of tiles. Furthermore, a user can customize the sidebar of the present invention.

BRIEF DESCRIPTION OF THE SEVERAL VIEWS OF THE DRAWING

The present invention is described in detail below with reference to the attached drawings figures, wherein.

DETAILED DESCRIPTION OF THE INVENTION

The present invention is directed to a system and method for providing a user interface with scalable prioritized tiles in an interactive peripheral view display. The tiles are non-overlapping and are arranged in adjoining positions to one another within a sidebar. The sidebar can be positioned in a horizontal or vertical configuration anywhere within the visual display area of a user's screen. Furthermore, the sidebar allows for automatic or user directed addition or removal of tiles. Even further, the sidebar visibly shrinks its content display, to provide users with a preview of the positioning and appearance of a newly added tile. Further still, an overflow area is provided for icons that represent tiles that could not fit within the sidebar.

Having briefly provided an overview of the present invention, an embodiment of the invention will be discussed with reference to FIGS. 1-12. An exemplary operating environment for the present invention is described below.

Exemplary Operating Environment

Figure 1:
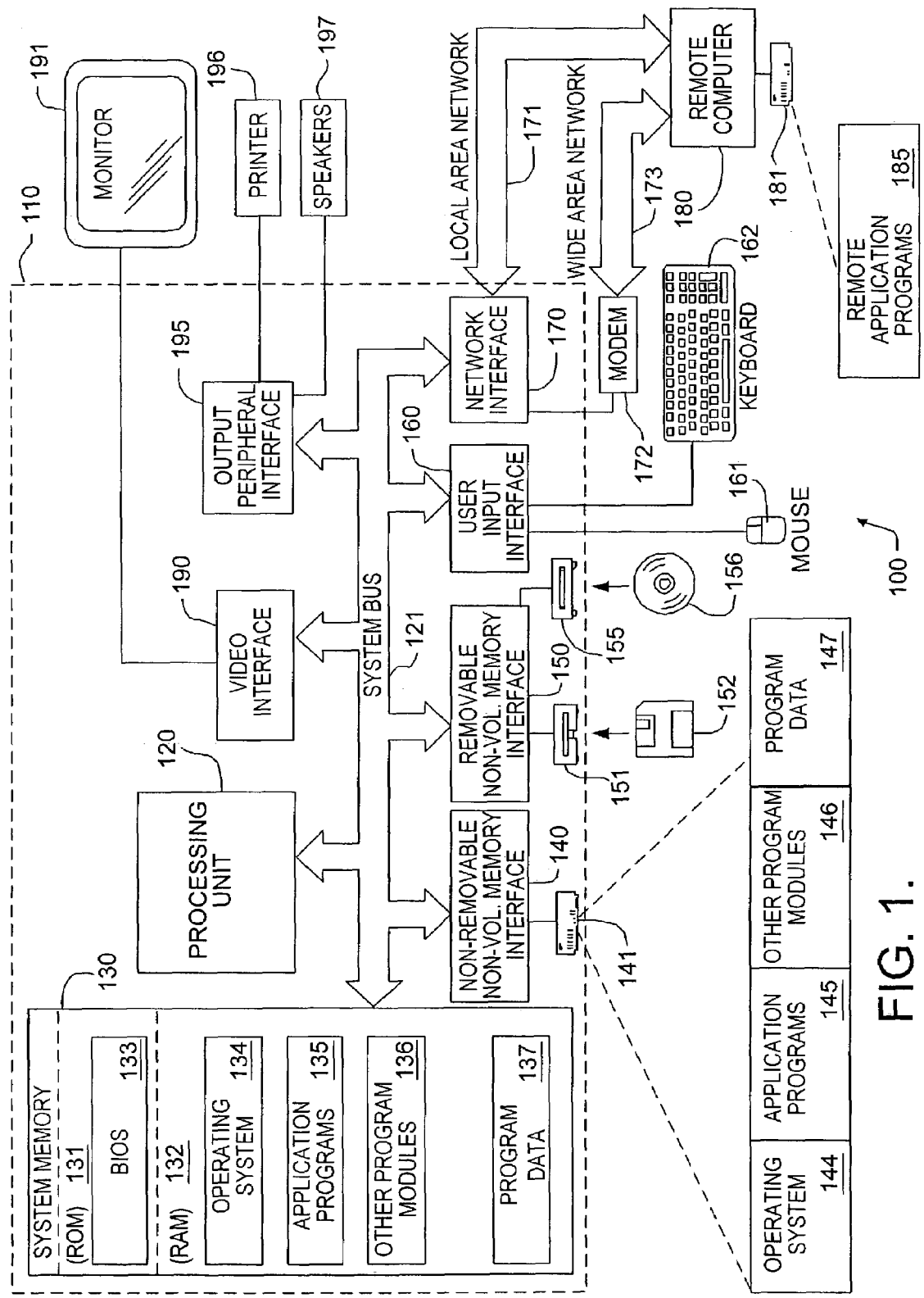
FIG. 1 is an exemplary computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

User Interface Sidebar

In order to understand and appreciate the present invention, it is necessary to first explore the concept of a sidebar and tiles. As used herein, a sidebar refers to a persistent display strip along one or more edges of a conventional display device. A tile is a dynamic thumbnail or "item" comprising, a combination of a description of information of interest and a "viewer" for displaying whatever information is represented. A more detailed description of the sidebar and the tile, which is otherwise referred to as a ticket, can be found in the application for letters patent, Ser. No. 10/063,296, filed Jun. 8, 2001 which is hereby incorporated by reference.

Figure 2:
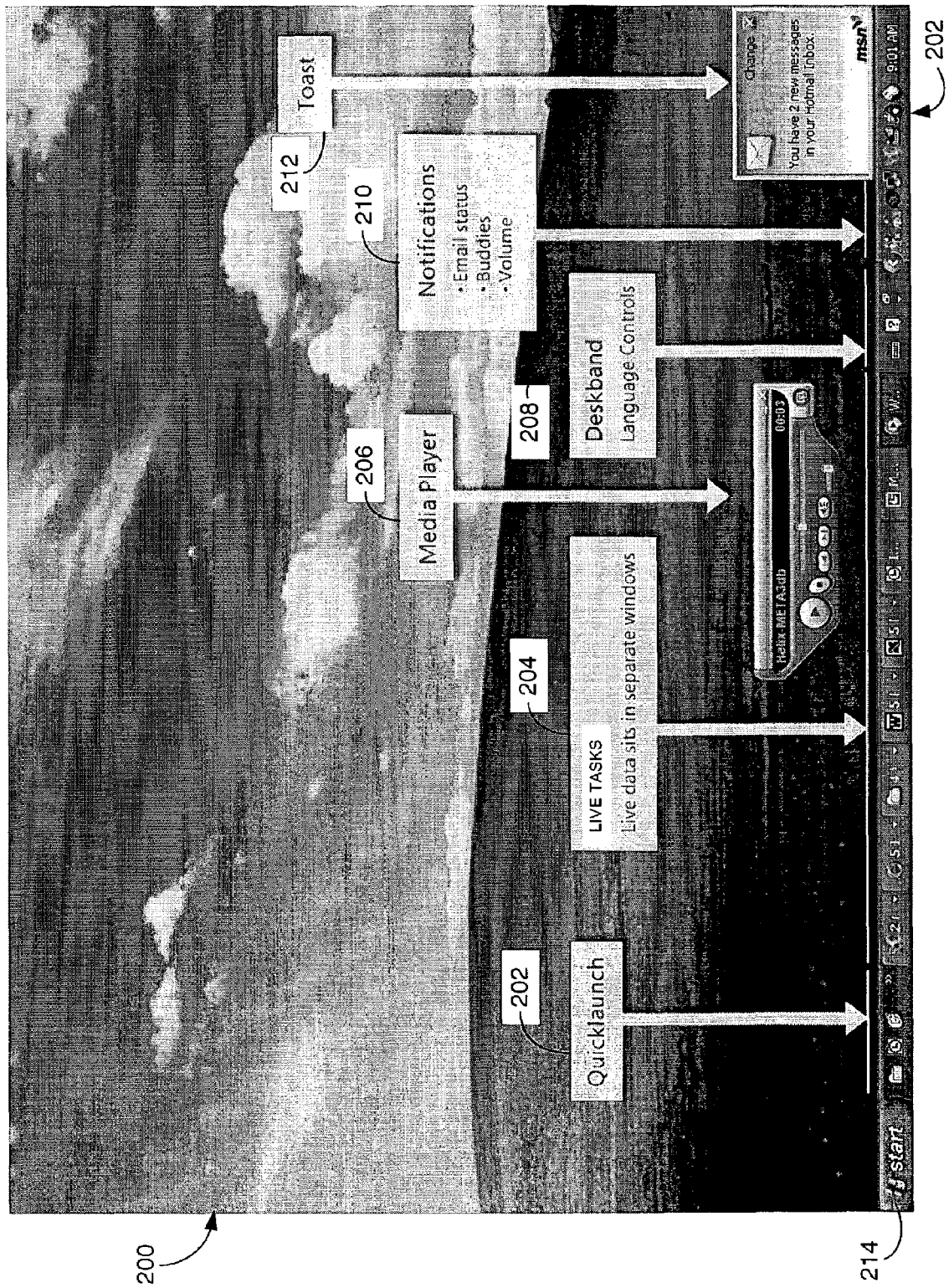
FIG. 2 is a screen shot illustrating a conventional user interface task bar in a computing environment.

As previously mentioned, conventional user interface displays are very restricted in the information that they convey or present to a user. Such systems typically provide a task bar from which a user is able to activate an application window of interest in order to interact or obtain information. Various control types are utilized by such conventional prior art systems to present information to a user. Some of these control types include scroll bars, expandable short lists, start menus, dash boards and controls that cause only active items to be visible. An example of a conventional user interface is illustrated in FIG. 2 and generally referenced as display 200.

As shown, display 200 includes a taskbar 202. Generally, taskbar 202 may contain a variety of task groupings or sections that provide access to applications or features of the operating environment through icons. For example, a section of taskbar 202 may provide a quick-launch section 204. Quick-Launch 204 enables the launching of one or more application programs such as a word processing application program, electronic mail program, or any other programs on the computing system that may have been appropriately configured to start from quick launch 204.

Another section of taskbar 202, such as live-tasks 204, may list currently executing tasks. From live-tasks 204, a user may access a display window that is associated with a program in order to interact with program specific live data. An example of such a window is the media-player 206 window. Using the media-player 206 window, a user can view live information regarding the currently playing media and direct the actions of the media player at the user's discretion.

Yet another section of taskbar 202 may be a desk-band 208. Desk-band 208 is an example of language controls for the operating environment.

A section of taskbar 202 may also contain notifications 210. Notification area 210 provides icons relating to application programs or system level communications. For example, electronic mail status, chat group buddies or even volume control can be accessed through icons in the notifications section 210.

In an attempt to provide live status information, taskbar 202 provides for a toast 212. Toast 212 is essentially a pop-up window that provides communication from an application program. For example, as shown a pop-up message is displayed informing the user that there are messages in an inbox.

Finally, taskbar 202 provides for a start icon 214 that provides access to other programs and features of the operating environment. It should be noted that the described contents of the taskbar are merely representative and not intended to be an exhaustive list.

As can be appreciated, taskbar 202 can become quite cluttered. Furthermore, the various types of icons available to an end user are inconsistent. Even further, taskbar 202 does not easily provide a user with information and controls that the user may need to immediately access. Further still, taskbar 202 involves a multiple step approach to access any information. For example, to get access to a volume control, a user must first select the volume control icon from the notifications section 210. This causes a volume control to be displayed. The user can then adjust the volume to the desired level.

Figure 3A:
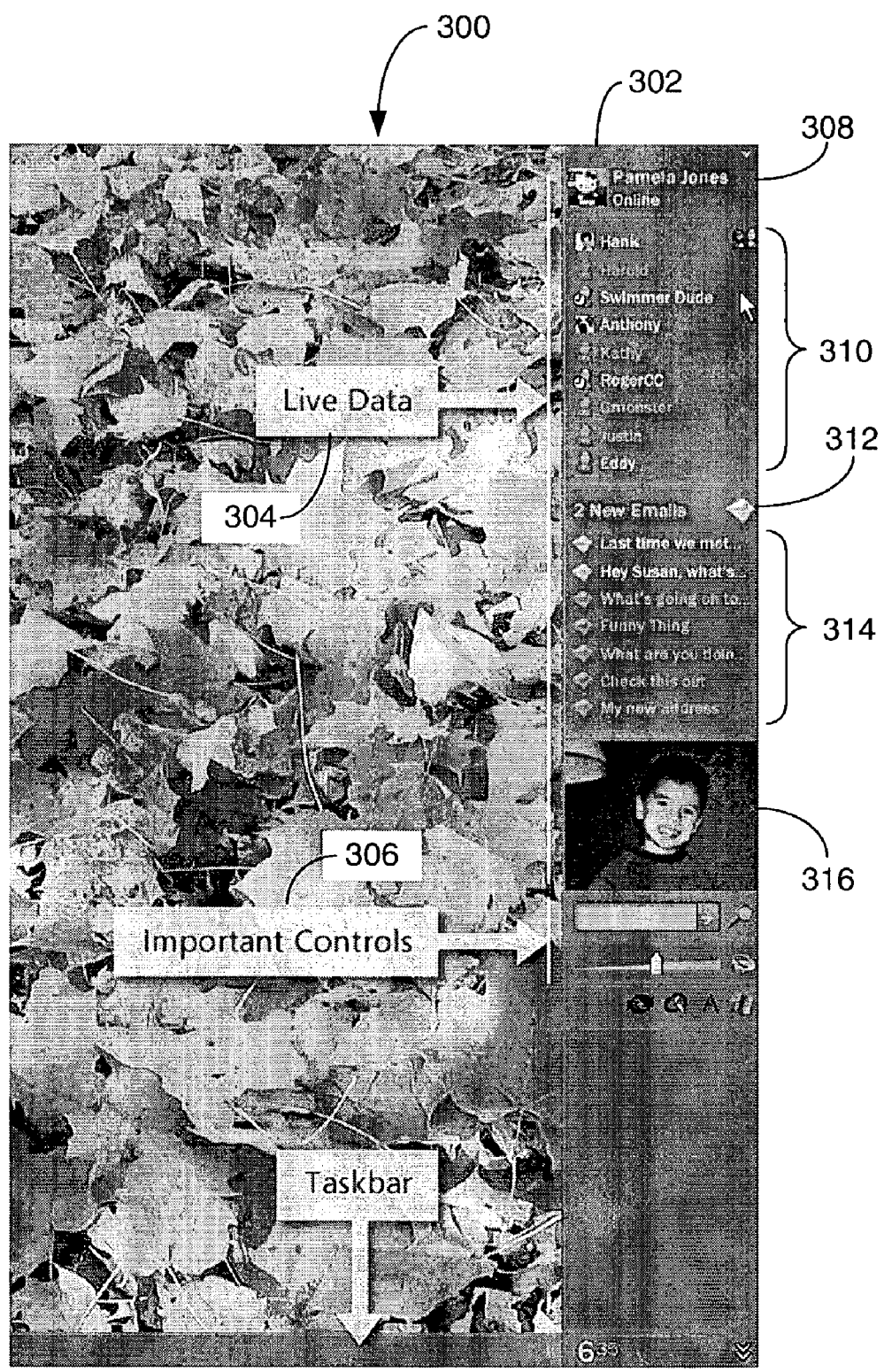
FIG. 3 is a screen shot illustration of a sidebar for practicing the present invention.

A resolution to this tedium is provided by the system and method of the present invention and generally referenced as display 300, illustrated in FIG. 3A. Shown in display 300, is a sidebar 302. Sidebar 302 provides an opportunity to reduce screen clutter and increase consistency in the way that information is conveyed to a user. Furthermore, sidebar 302 as displayed includes a live-data area 304, for live information of interest to the user, as well as a platform important-controls area 306, for frequently used controls. Within live-data 304, there may be a plurality of tiles related to a plurality of applications and information items. Important-controls 306 may also contain tiles for any one or more items used in controlling system or application parameters.

Live-data 304 contains for example, a 'Pamela Jones Online' tile 308, which may provide access to Internet or network applications, or other functions including messaging, chat, email and browsing. 'Pamela Jones Online' tile 308 further contains individual contact tiles 310. Some of the individual contact tiles 310, for 'Pamela Jones Online' 308 are also displayed within live-data 304. In other words, 'Pamela Jones Online' tile 308 may be thought of as a header and the individual contact tiles 310 would be considered the body. Another example of live-data 304 is the email notification tile 312, which contains a listing of emails 314. As shown, email notification 312 indicates that there are two new mail messages. Correspondingly, the top tow email listings 314, are highlighted to indicate that they are new and unread. Yet another example of live-data 304 is a video tile 316, which is updated in real time within the sidebar 302. Sidebar 302 can be presented or located in a variety of ways and provide varying information.

Figure 3B:
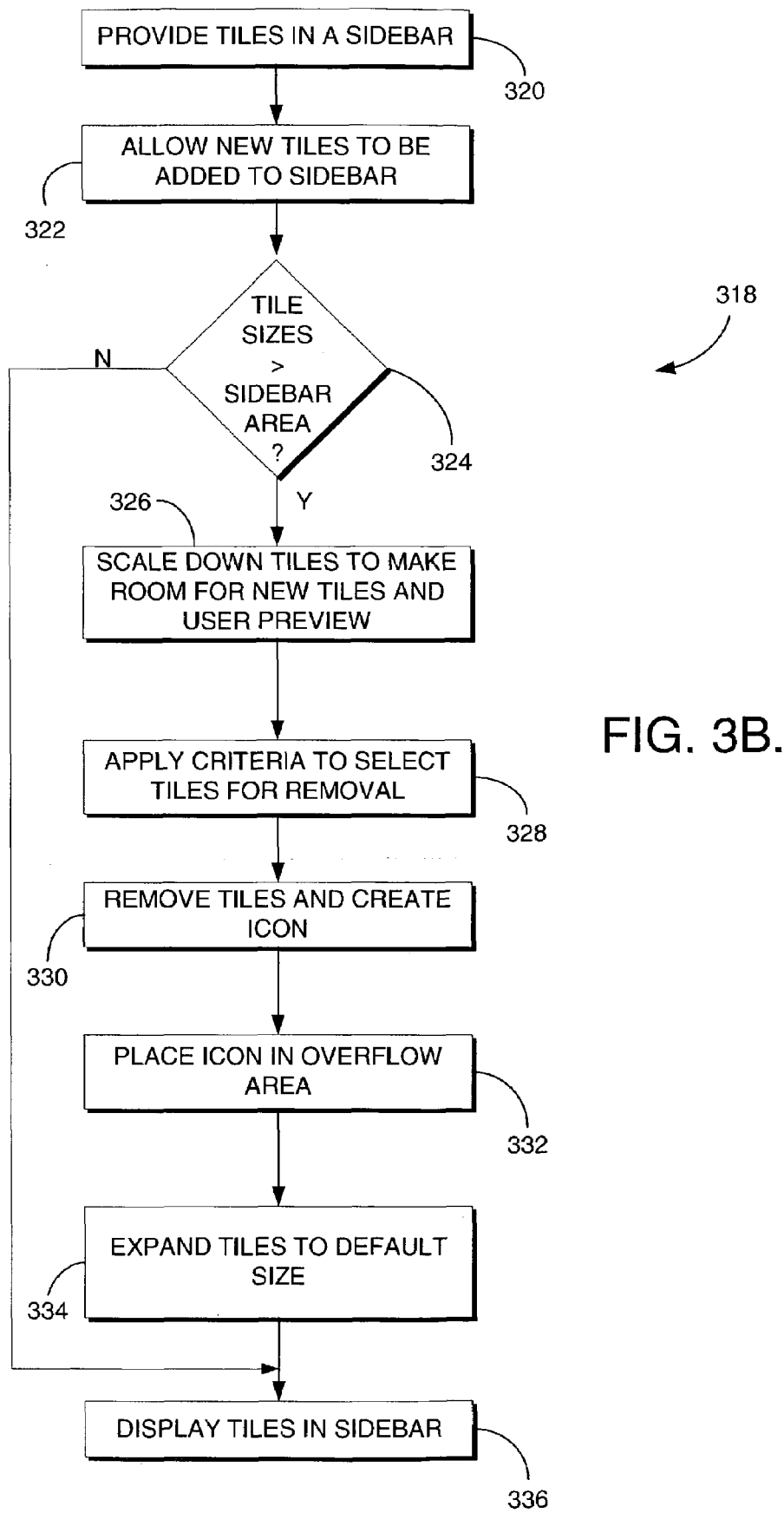

In order to provide a frame work for understanding the present invention, an overview of is described with reference to FIG. 3B. More detailed information on the various aspects will be provided through the course of the entire document. In operation, one or more tiles are provided in a sidebar 302, at step 320. As previously explained, the tiles provide a user with access to items of interest such as live data and access to frequently used controls. A user has the ability to modify the sidebar 302. In other words, a user can add, remove, resize tiles or perform other manipulation of the displayed tiles as necessary. The following discussion will discuss the addition of a single tile, but as it should be understood that the concepts are equally applicable to multiple tiles and other modifications.

As shown at step 322, a user may add a new tile to the sidebar 302. When a tile is added, the system and method of the present invention determines if the total display area to be occupied by all tiles, including the new tile will exceed the display area of the sidebar. This determination is made at step 324. In other words, a determination is made as to whether there is enough room to fit the new tile, in addition to the existing tiles within the sidebar, using the default sizes of all the tiles. If it is the case that the tiles will all fit, then the new tile is added to the sidebar and displayed, at step 336.

On the other hand, if it is determined at step 324 that the new tile will not fit at its default size, then all the tiles are squished. This means that both existing tiles and the new tile are scaled down in size within the sidebar, at step 326. The new tile is shown in a preview state which may not necessarily show the complete content of the tile. In other words, if the previewed tile has a natural size that is too large, the tile may be cut off in addition to being scaled down. At the conclusion of the preview, the new tile grows to its natural size and may remain in the sidebar or be moved into an overflow area as discussed later in this document. Other tiles in the sidebar are typically just scaled down. The tiles are reduced to the extent necessary for all of the tiles to visibly fit within the sidebar 302. Next, the present invention applies any one of a number of criteria to select which tiles and how many of them would need to be removed from the sidebar, at step 328. The purpose being to enable the remaining tiles to be displayed at their default sizes. At step 330, the tile(s) selected in the previous step are removed. Concurrent with the removal of any tile, an icon is created to represent the removed tile. The icon is placed in an overflow area, at step 332. The overflow area will be described in more detail later in this document. With the 'excess' tile(s) out of the way, the remaining tiles are expanded to their default sizes, at step 334 and then displayed in the sidebar 302, at step 336.

Figure 4:
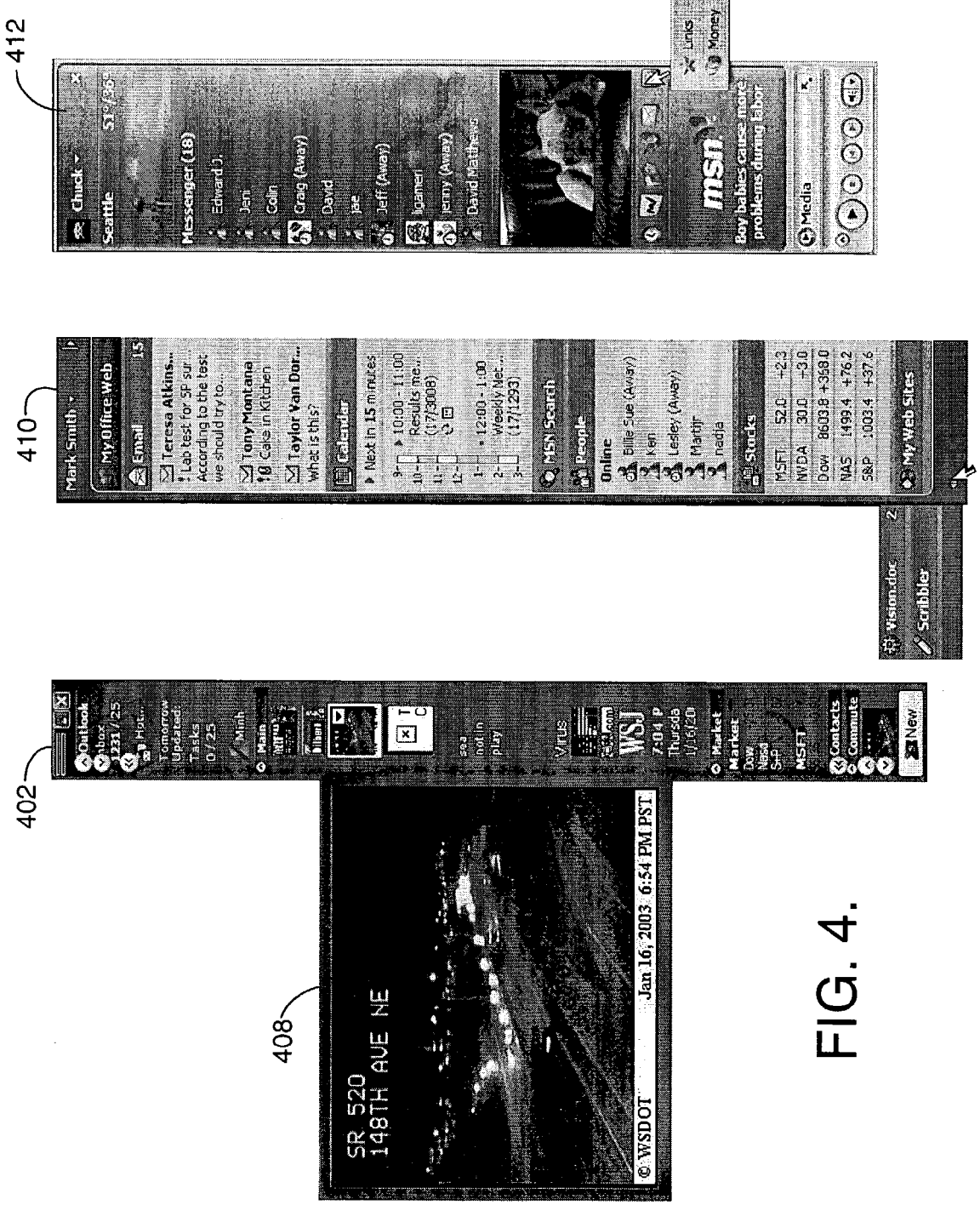
FIG. 4 is a screen shot illustrating an expanded flyout of a tile within a sidebar.
Figure 5:
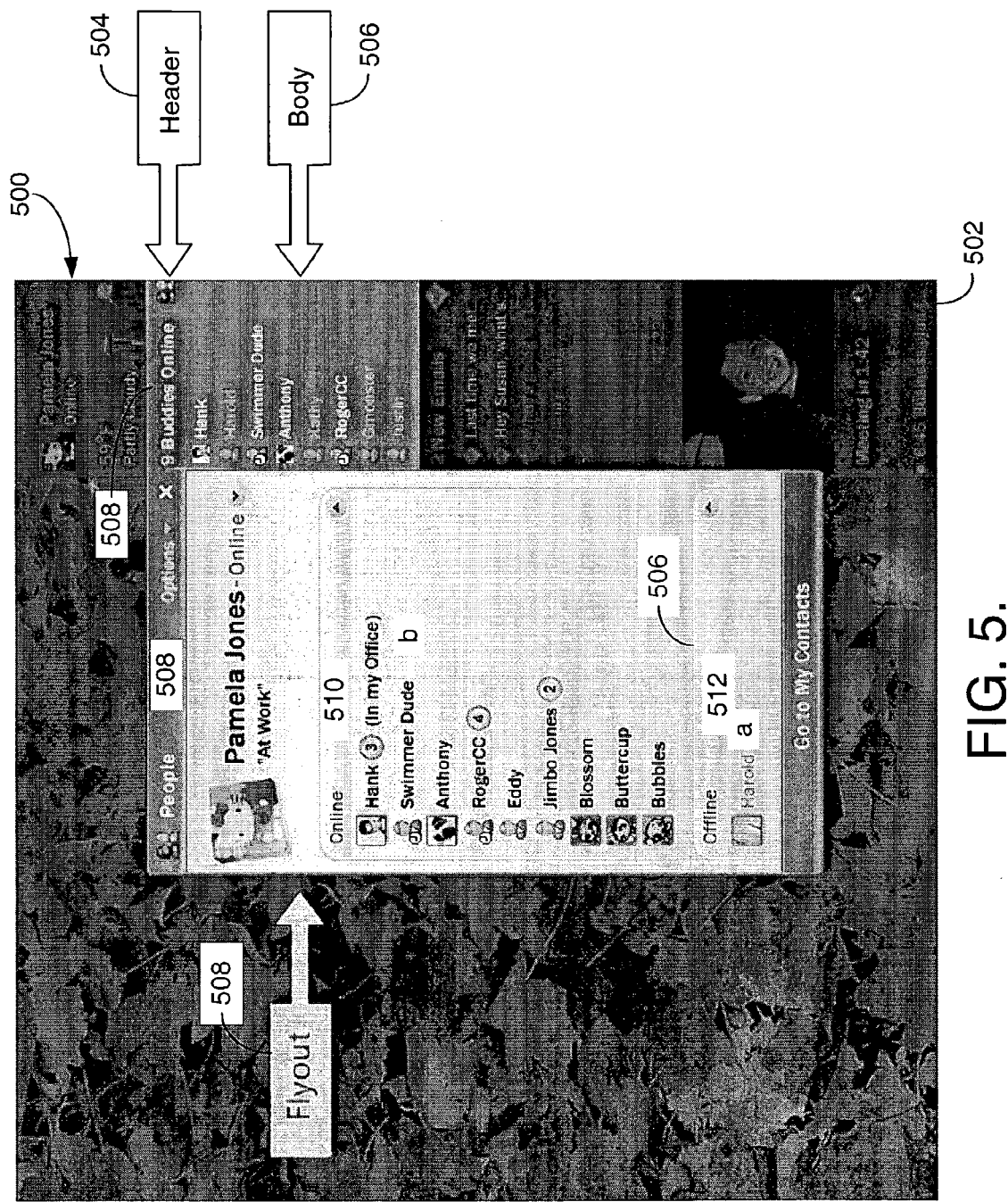
FIG. 5 illustrates a flyout of a tile from the sidebar of FIG. 3.

Other examples of 'sidebar-like' features are shown in display 400 of FIG. 4. As shown, Sidebar 402 contains a number of video tiles, a live stock status tile, and a number of other tiles to various news sources. Sidebar 410 presents e-mail, calendar, contacts, stock information and website favorites. Sidebar 412 also presents weather, messenger contacts, icons to other tiles and a media player control. Of particular note in sidebar 402, is flyout 408, which is an expanded view of one of the video tiles.

The expanded view of a tile can vary depending on the type of tile and the tile's other contents. For example, as shown in screen illustration 500 of FIG. 5, 'Pamela Jones Online' tile is shown in a flyout 508. Within the flyout 508 there are two categories of displayed information. A first category is the online group 510, which may have one or more online individual contacts and groups, 510. The second category is the offline group 512, which may have just an individual contact. It should be noted that when the information for 'Pamela Jones Online' is displayed within the sidebar 502, the body 506 includes individual contacts from both the online group 510 and the offline group 512. In other words, the two categories of the flyout 508 are blended in the sidebar 502. For example, offline contact 512A (Harold) is included within the body 506 of sidebar 502 and is displayed as individual contact 506B (Harold) in flyout 508.

Thus far, the discussion has focused on the parts of the sidebar and the information that it conveys. An aspect of the present invention is directed to the scalability of the sidebar. More particularly, an aspect is directed to how the sidebar handles existing and newly added tiles. In order to facilitate an understanding of scalability as provided by the present invention, an exemplary sidebar embodiment will be discussed with reference to FIGS. 6A-6D.

User Interface Squishing

Figure 6A:
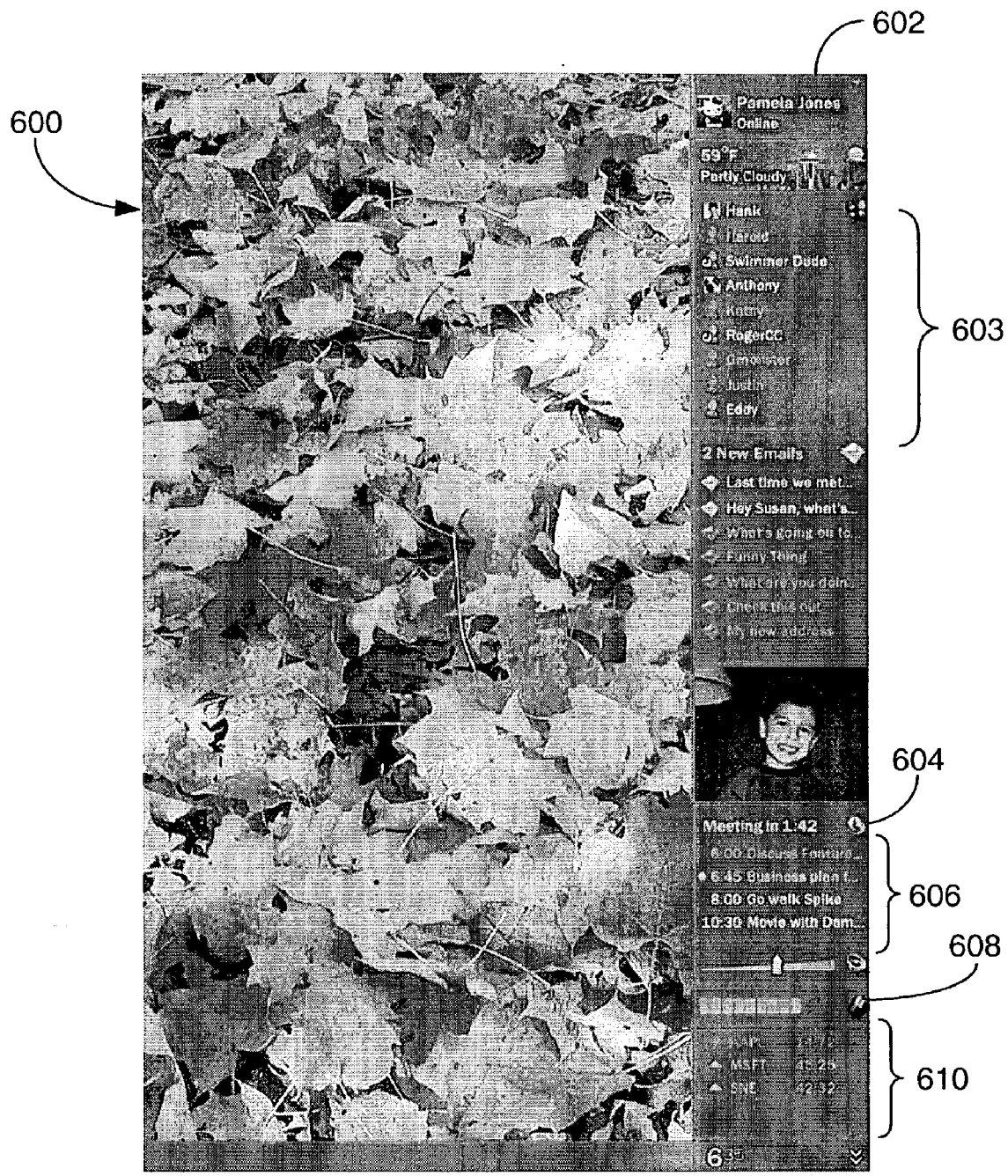
FIG. 6A depicts a sidebar filled with a plurality of tile items.

Turning initially to FIG. 6A, a display 600 illustrates a sidebar populated with a plurality of tiles, to what appears to be the sidebar's maximum capacity for tiles. For clarity and ease of discussion, this fully populated sidebar will be referenced as max-sidebar 602. As shown, max-sidebar 602 merely contains other tiles in addition to those found in sidebar 302 of FIG. 3. Otherwise, the sidebars 302, 602 are similar and are characterized by the same features. For example, a meeting notification tile 604 in FIG. 6A along with calendar items 606, were added to max-sidebar 602. Meeting notification tile 604 is the header information and calendar items 606 are the body. Also added to max-sidebar 602 is a progress bar 608 that provides download progression or resource utilization information, such as battery power. Another set of tiles that are included in max-sidebar 602 are stock tiles 610 that display a portfolio of live stock information.

The point being that at any point in time, quick and convenient access to some informational items may be achieved by adding other tiles to a sidebar. However, as previously noted, it may well be the case that max-sidebar 602 already contains the maximum number of tiles that it is able to display. An aspect of the system and method of the present invention provides a solution to overcome this limit. The present invention provides for an overflow area within the sidebar, to locate icons for tiles that cannot fit in the sidebar. This feature is illustrated in FIG. 6B.

Figure 6B:
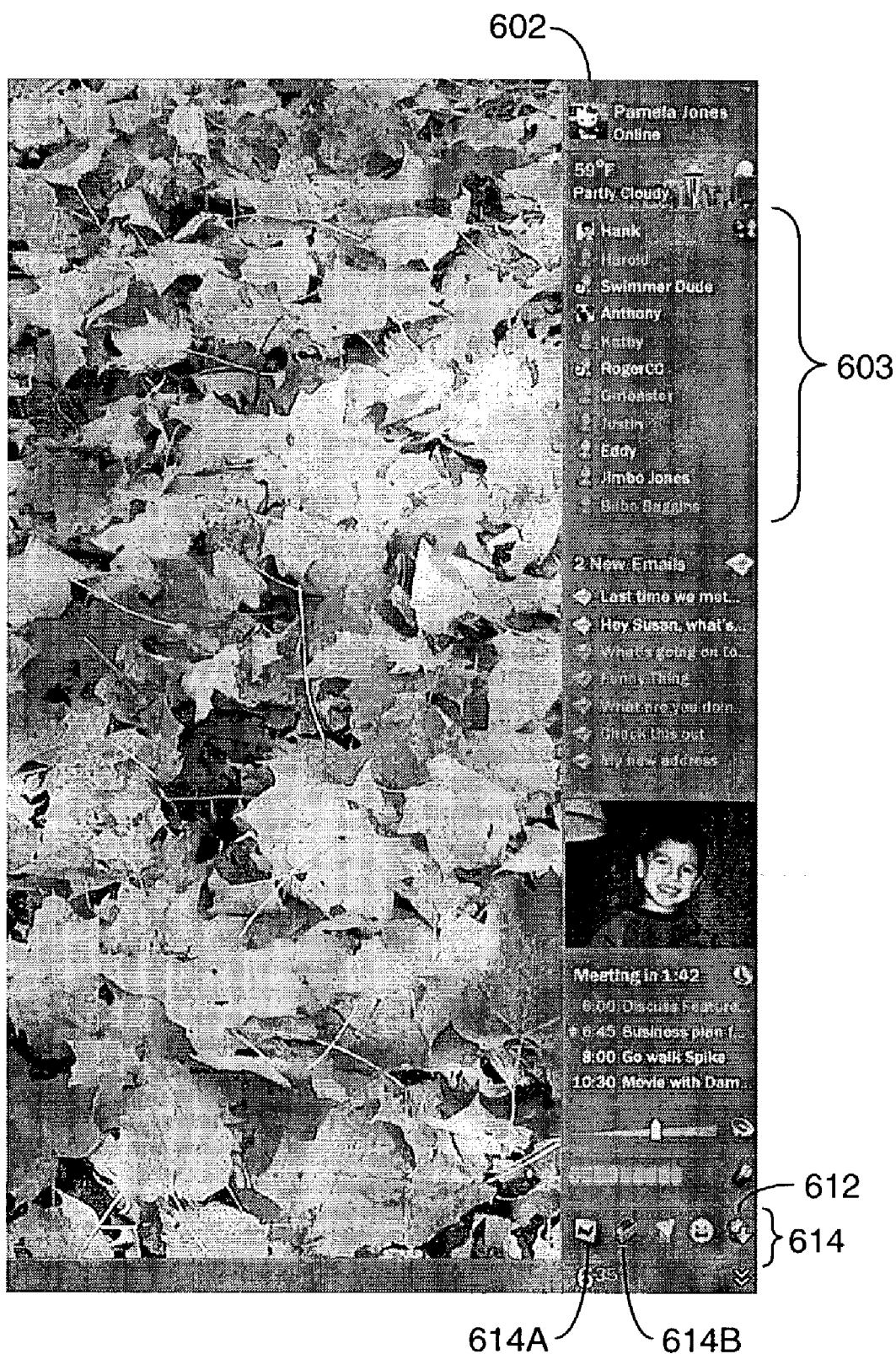
FIG. 6B depicts a sidebar filled with a plurality of tile items and an overflow area with a row of icons.

As shown in FIG. 6B, two new individual contacts are added to max-sidebar 602. In particular, new individual contacts 'Jimbo Jones' and 'Bilbo Baggins', were added to the contacts 603 of the 'Pamela Jones Online' header tile. The effect of this addition is that there is insufficient room in max-sidebar 602 for all of the tiles. As a result, the system and method of the present invention provides for the removal of one or more tiles from max-sidebar 602, in order to make room for the new tiles.

Any one of a number of conventional selection criteria can accomplish determining which tiles get removed and iconized. Typically, the tile(s) at the bottom of the sidebar get moved into the overflow area. Selection could also be based on a first in last out, least utilized tile, lowest priority tile, user selected tile or any one of a number of criteria. In either case, once the selection is made, room is created in an appropriate position of max-sidebar 602 to hold the newly added tile(s). Removal of a tile does not completely eliminate access to the tile from max-sidebar 602. Instead, Icons 614 are created to represent removed tiles. Icons 614 are placed in an overflow area 612 of max-sidebar 602. For example, in the illustrated screen of FIG. 6B, the addition of the new individual contacts resulted in the removal and iconization of the stock quote tiles 610. Icon 614A was thus created and placed in the overflow area 612. In order to access or view the stock quotes 610, a user may select Icon 614A.

Figure 6C:
FIG. 6C depicts a sidebar filled with a plurality of tile items, an overflow area with a row of icons, and a tile flyout from the overflow area.

FIG. 6C illustrates max-sidebar 602 including the overflow area 612 and a Portfolio flyout 616. Portfolio flyout 616 is associated with and contains the stock quote tiles 610. When Icon 614A is selected from within the overflow area 612 portfolio flyout 616 is displayed. Flyout 616 contains the stock quote tiles 610, which can then be accessed in the same manner as when they were displayed within max-sidebar 602.

Figure 6D:
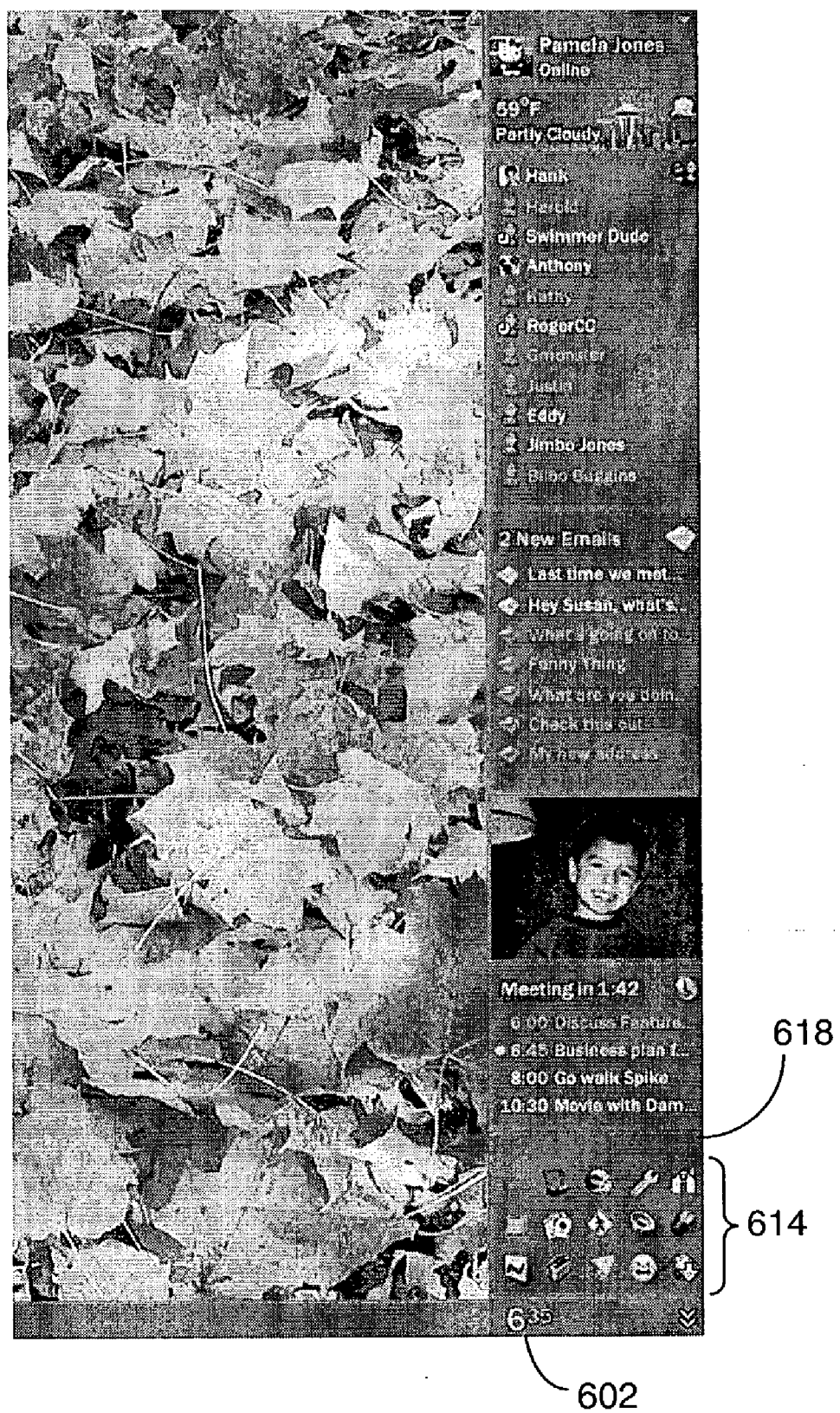
FIG. 6D depicts a sidebar filled with a plurality of tile items and an overflow area with multiple rows of icons.

As the number of items moved from the max-sidebar 602 or directly added into the overflow area 612 increases, the overflow area 612 expands to accommodate more icons. As best seen in FIG. 6D, an expanded-overflow area 618 can contain multiple rows of Icons 614. In turn, this results in further removal and iconization of more tiles from the max-sidebar 602 to make room for the expanded-overflow area 618. For example and as illustrated, the placement of the multiple rowed expanded-overflow area 618 within the max-sidebar 602, results in removal and iconization of the volume control and progress bar 608.

Figure 7A:
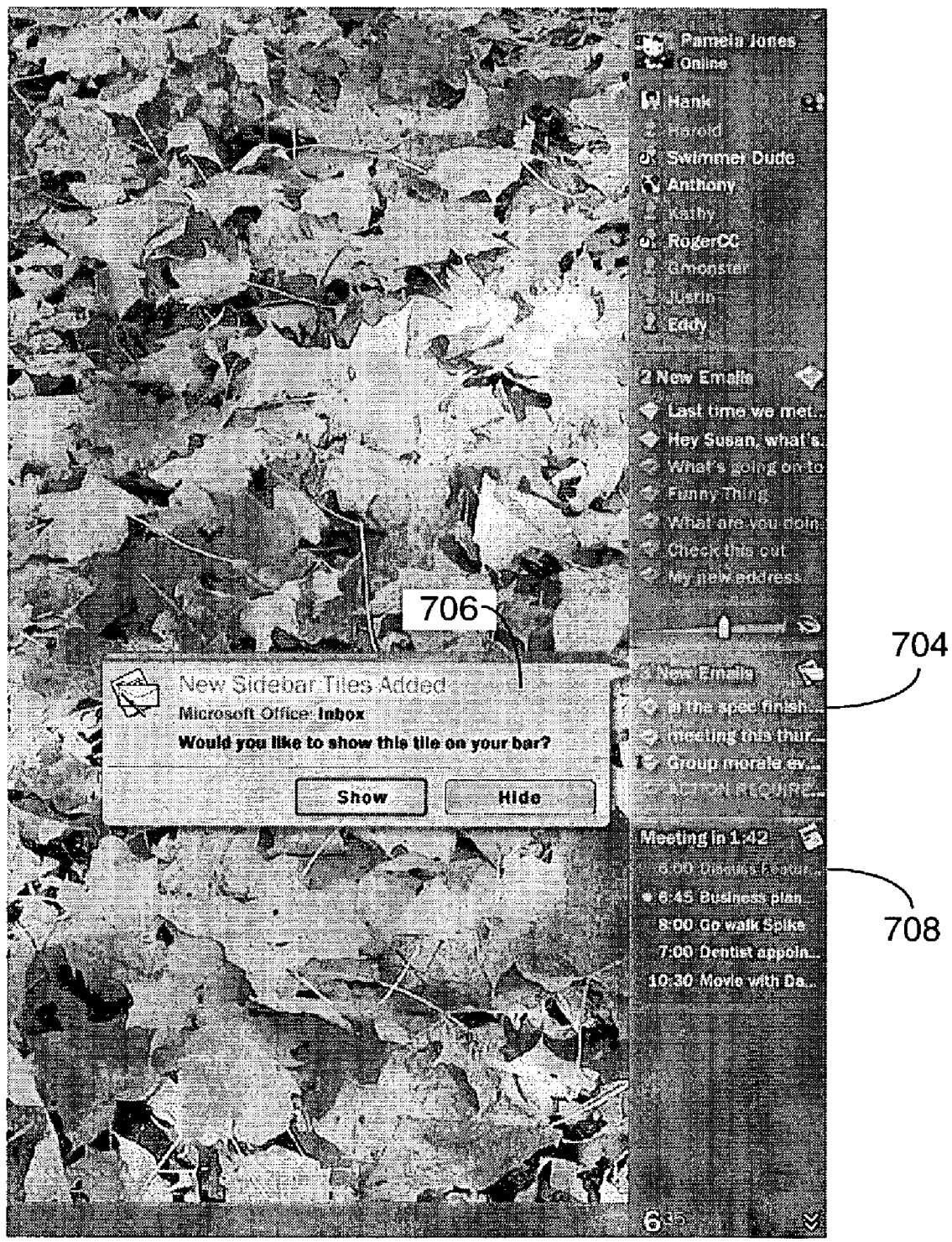
FIG. 7A illustrates the addition of a first new tile along with the associated user prompt.
Figure 7B:
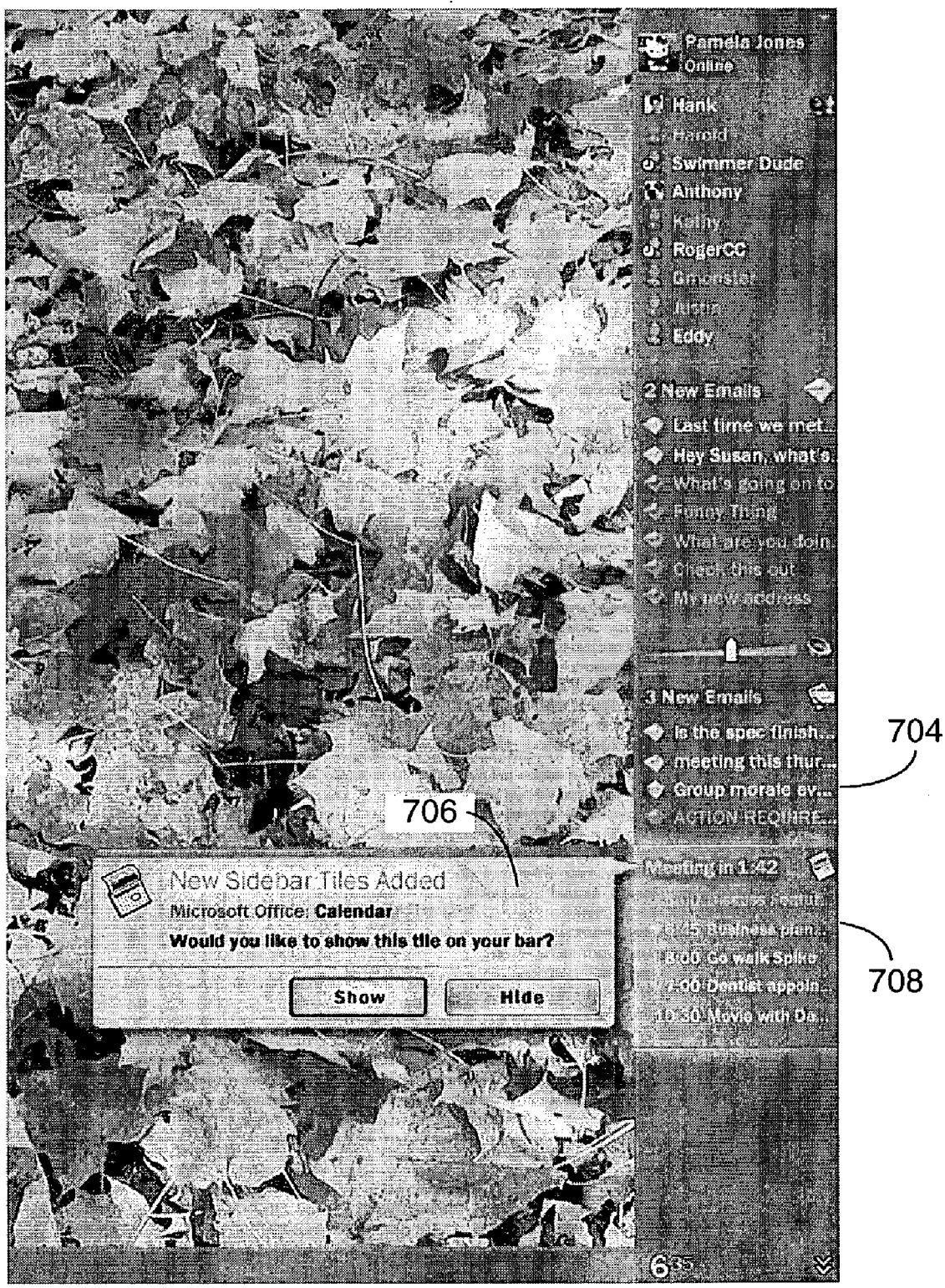
FIG. 7B illustrates the addition of a second new tile along with the associated user prompt.
Figure 7C:
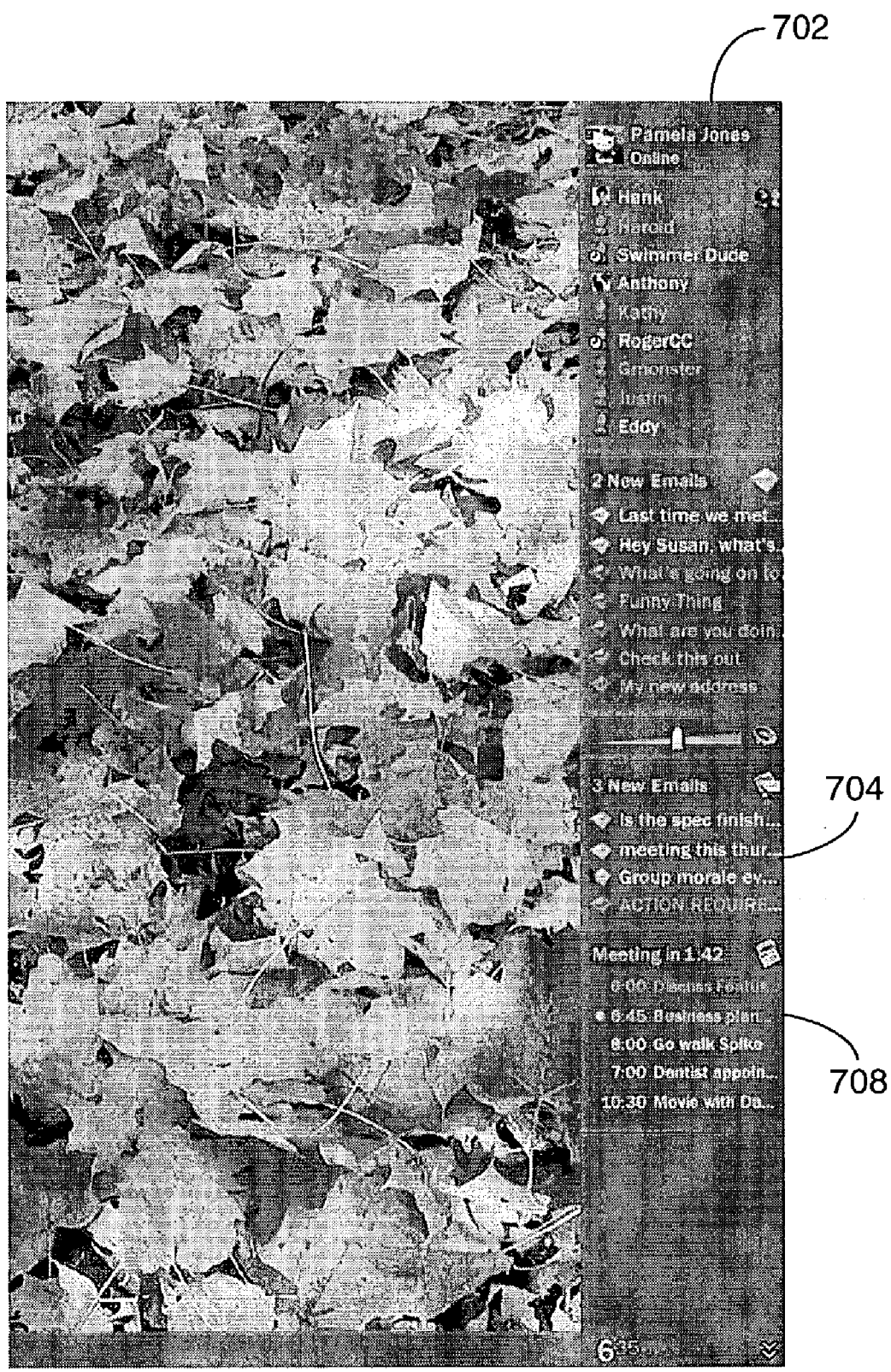
FIG. 7C illustrates the sidebar and the location of the newly added tiles.

Having discussed the resultant effects of the system and method of the present invention from a visual and user access perspective, we turn next to the functions and process associated with adding or removing tiles from the sidebar, which will be discussed with reference to FIGS. 7A to 7C.

It should be understood that tiles might be added to the sidebar in an automatic or user request mode. Automatic addition occurs in conjunction with the installation of application programs and with the operation of transient controls. User requested tile addition occurs through a tile configuration user interface program or by user designation within an application program. The mode of tile addition determines the priority and consequently the position of the tile within the sidebar.

With regard to automatic tile addition, when an application is being installed, the associated new tiles are added to the bottom of the sidebar. In an embodiment of the present invention, users are given an opportunity to preview the sidebar. Users can see what the sidebar will look like, once the new tile has been added. For example, as shown in FIG. 7A, the addition of an electronic mail inbox tile 704 to the sidebar 702, results in a user prompt 706. With the aide of prompt 706, the user may selectively cause the inbox tile 704 to remain as shown within the sidebar 702 or be hidden. Similarly, in FIG. 7B, the user is prompted about adding the calendar tile 708 to the sidebar 702. When the user selects to show the new tile in the sidebar, the new tile is added to the bottom of the sidebar. This effect is illustrated in FIG. 7C, wherein electronic mail inbox tile 704 and calendar tile 708 are placed at the bottom of the sidebar 702. It should be understood that placement of tiles within the sidebar may vary according to other aspects of the present invention.

In a further aspect of the present invention, the user is given a timed opportunity to remove new tiles from the sidebar. Consistent with this aspect, if there is insufficient room within the sidebar, existing tiles within the sidebar are scaled down (squished) to make room for the new tile and give the user an opportunity to see what the new tile will look like. In other words, there is a timed preview of the sidebar with the added new tile. The preview lasts for a finite duration during which the user may arrange the sidebar as needed. Thereafter, the sidebar expands back to its normal size. A tile that is located at the bottom of the sidebar if the sidebar is full, is then moved into the overflow area and represented by an icon.

In an embodiment of the present invention, the preview time for a new tile is ten seconds. In other words, the tiles stay squished for ten seconds. Importantly, the squished tiles are still functional and selectable to respond as they would in the expanded state. The squished tiles are scaled reductions not just small bitmap pictures of the original tile.

There is a maximum display size for a tile during its preview, so as to prevent too much squishing of the other tiles within the sidebar. The maximum display size is determined for example, based on display resolution, available space or other such algorithms. During the squishing of tiles, the horizontal and vertical aspect ratios of each tile are maintained as to other tiles. Even further, there is a smooth, continuous transition from the full scale or expanded size of a tile to the squished size of the tile. This transition prevents hard and jittery changes that would impact the user experience.

The system and method of the present invention can handle a variety of tiles. Thus far, the discussion has focused on tiles that are always visibly present. Another type of tile that is addressed by the present invention is the transient tile. A transient tile is one that only appears as needed and generally appears at the bottom of the sidebar. As with the new tiles, if there is no room, the entire sidebar is squished to make room for a previous addition of a transient tile. Here also, after a ten second preview, the sidebar expands and the transient tile is moved into the overflow area. Transient tiles can be removed from either the sidebar or overflow area, when they are no longer needed. When a transient tile does reappear, it returns to its last position within the sidebar or overflow area.

Figure 8A:
FIG. 8A illustrates a sidebar prior to the appearance of a transient tile.
Figure 8B:
FIG. 8B illustrates the sidebar of FIG. 8A including a transient tile.

The operations of a transient tile are best explained by way of an example, as shown in display 800 of FIG. 8A. As shown, it will be observed that the last tile within the sidebar 802 is a volume control tile 804, below which there is an overflow area 806. When a transient progress bar tile 808 (FIG. 8B) is needed, the tile is added to the sidebar 802, causing the sidebar 802 to become squished to make room. This squished effect is illustrated in display 807 of FIG. 8B.

Figure 8C:
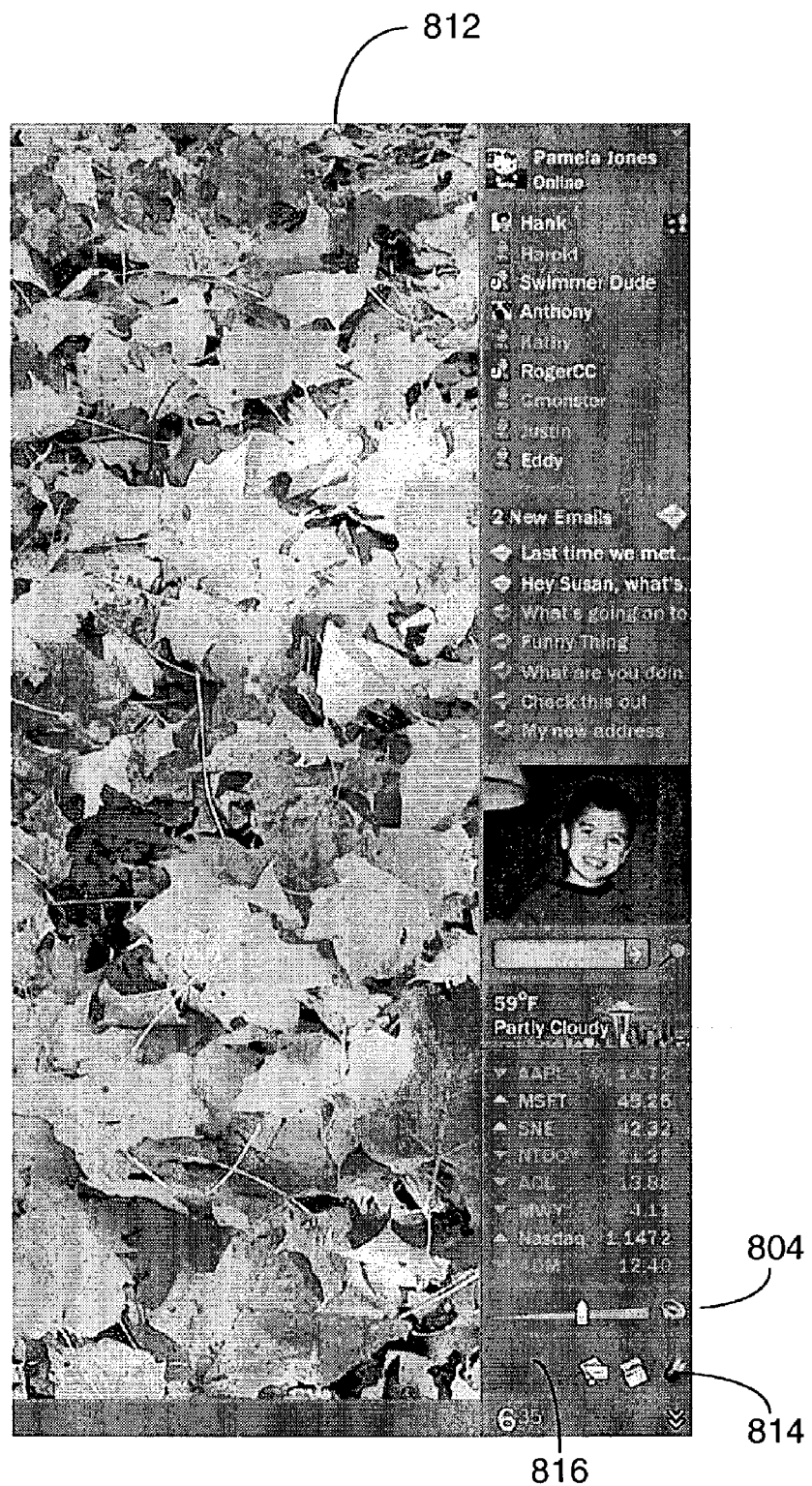
FIG. 8C illustrates the sidebar of FIG. 8B after the transient tile has been removed and placed in an overflow area.
Figure 9:
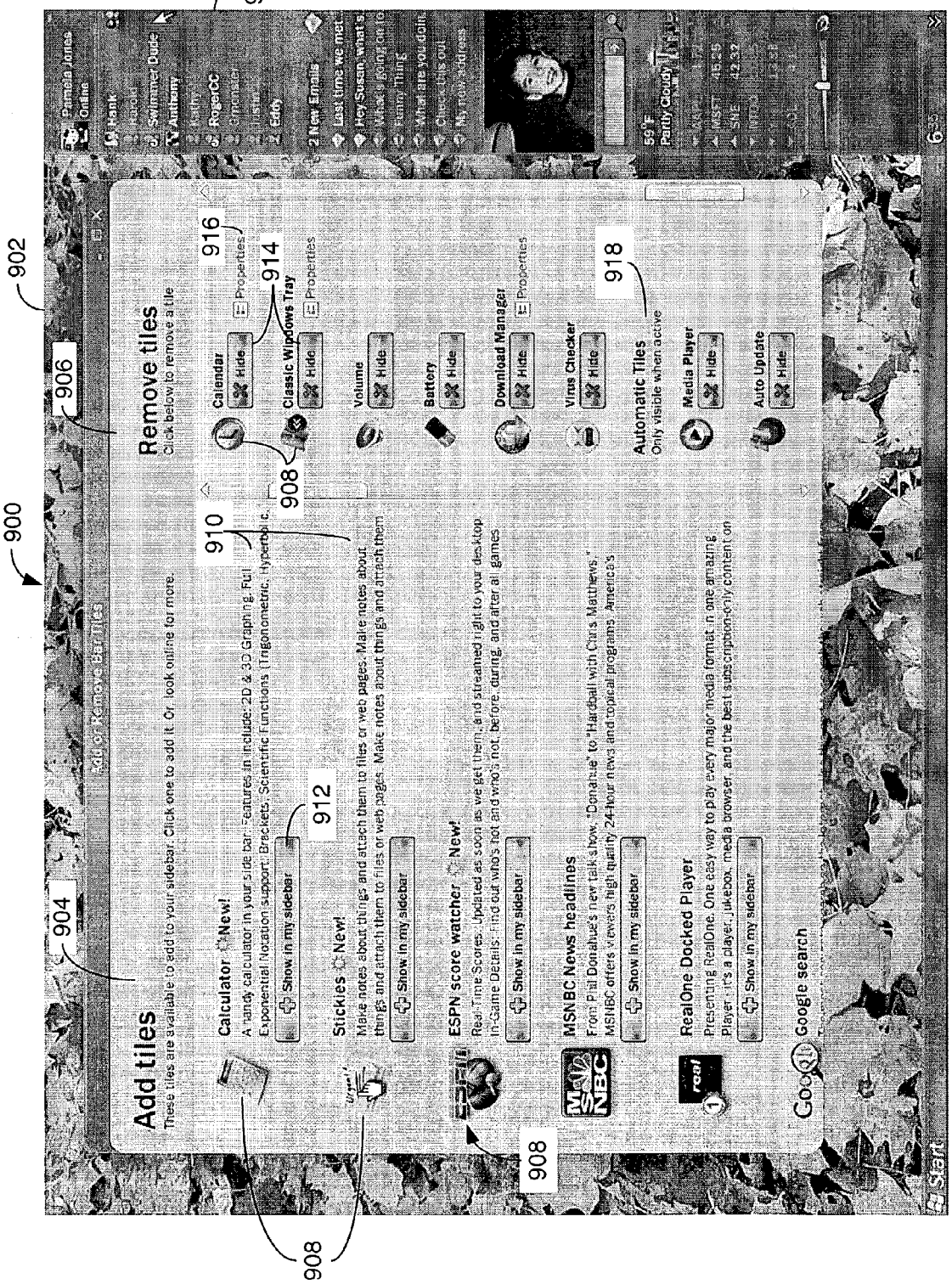
FIG. 9 illustrates an exemplary configuration screen to facilitate a user's request to add or remove tiles from the sidebar.

A squished-sidebar 810 is shown in display 807. The squished-sidebar 810 has its entire constituent tiles scaled down from their previous sizes in sidebar 802 of FIG. 8A. As previously mentioned, this squished preview state is only maintained for a brief duration. The sidebar returns to its unsquished state after the preview period and the transient tile is placed in the overflow area. This effect is shown in FIG. 8C, where transient progress bar tile 808 is removed from the sidebar 812, and a new icon 814 representative of the transient tile is placed in the overflow area 816.

Next, we consider the second mode of tile addition or removal operations which are namely user requested operations. User requested tile additions or removals may occur via a configuration interface, such as the one illustrated in display 900 of FIG. 9. By virtue of the operating environment or any previously installed application programs, a user may be presented with an options screen 902. In an embodiment of the present invention, option screen 902 includes an add tile column 904 and a remove tile column 906. Add tile column 904 provides the user with a tile image 908, a description 910 and a show button 912. After reviewing an associated description 910, a user may select the show button 912, to cause the associated tile to be placed within a sidebar. The process for placement of a tile within the sidebar is practically identical to that described earlier in reference to automatic tile addition. In other words, the squishing of the sidebar and movement of tiles into the over flow area are practically identical. However, one exception does exist with regards to the behavior of a tile prior to the tile being bumped into the overflow area. When a manually added tile has caused a squishing of the sidebar to occur, tiles that are about to be bumped into the overflow area will flash. In other words, prior to the expansion of a previously squished sidebar and consequently the bumping of any tiles into the overflow area, the attention of the user is drawn to the tiles that are about to be bumped.

Removal of an existing tile from the sidebar may be accompanied by user request via options screen 902. The remove tiles column 906 provides a user with a tile image 908, a properties icon 916 and a hide button 914. The remove tiles column 906 lists all existing and removable tiles that are within the sidebar. The remove tiles column 906 also indicates separately tiles that are of a transient nature. Transient tiles are designated under the automatic tiles heading 918. The properties icon 916, as the name suggests, enables the user to view information specific to the tile. The hide button 914 causes the removal of the associated tile from the sidebar or overflow area. In the case of a transient tile, the hide button 914 prevents the tile from showing up within the sidebar even when the transient tile is needed.

As mentioned earlier, tile addition may also occur by user designation from within an application program. For instance, an application can host a standard control that adds a tile to the sidebar. When such a tile is added to the sidebar, the tile is placed at the top of the bar as opposed to the other situations, where the tile is placed at the bottom of the bar. In those instances where there is insufficient room in the sidebar, the sidebar is squished as in all other cases. Prior to expansion, the tiles at the bottom flash before getting bumped into the overflow.

An even further aspect of the present invention relates to the scalability and resizing of tiles. This aspect will be discussed with reference to FIGS. 10A and 10B. Generally, within the present invention, a tile can resize itself as needed. However, there is a threshold size, which a tile can only achieve with user approval. In an embodiment of the present invention, the utilized threshold is 200 logical pixels. A user may manually resize a tile. When a manual resize occurs, the tile is prevented from automatically resizing. However, a user may re-grant permission for the tile to resize.

Figure 10A:
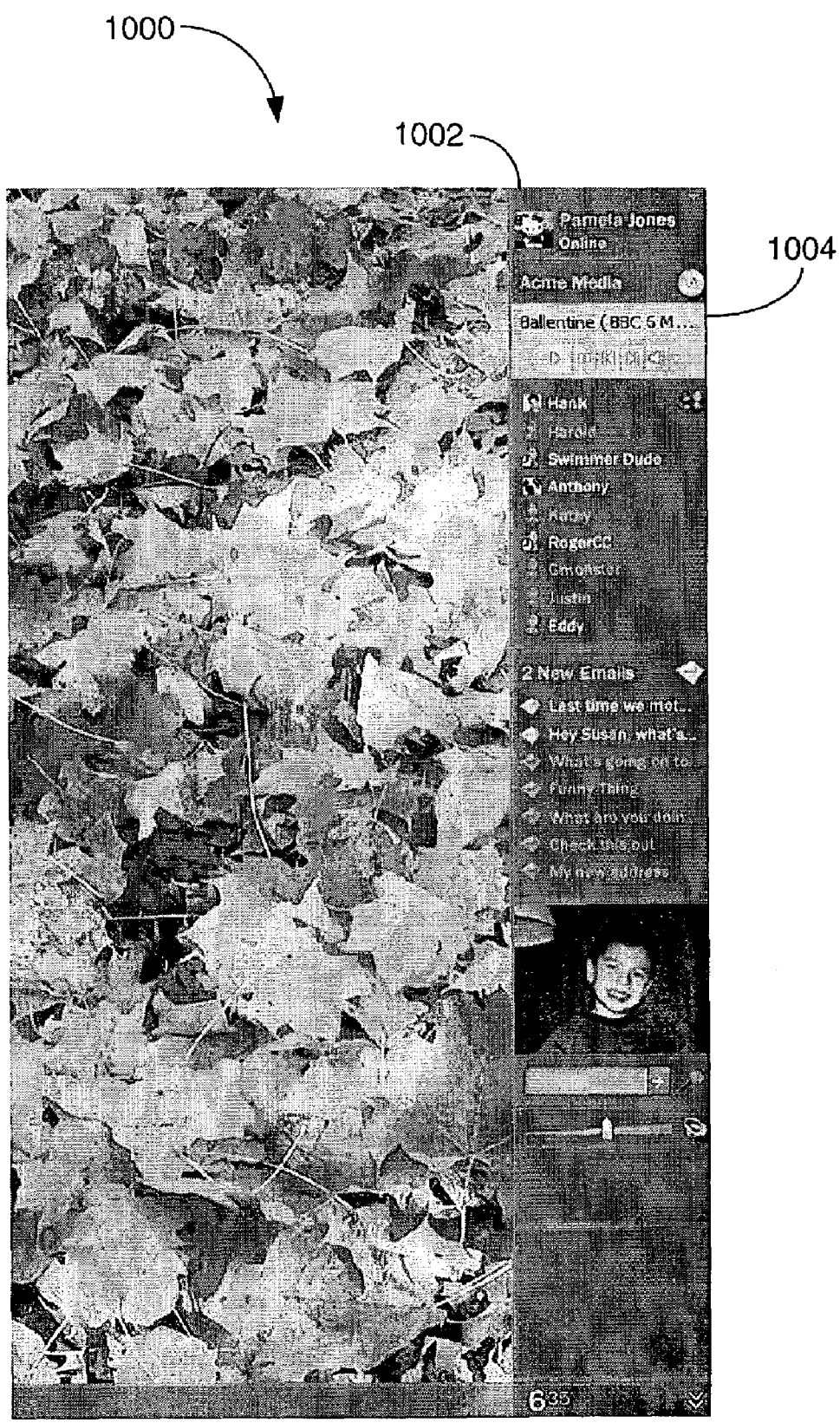
FIG. 10A illustrates a sidebar with tiles displayed in the default size.
Figure 10B:
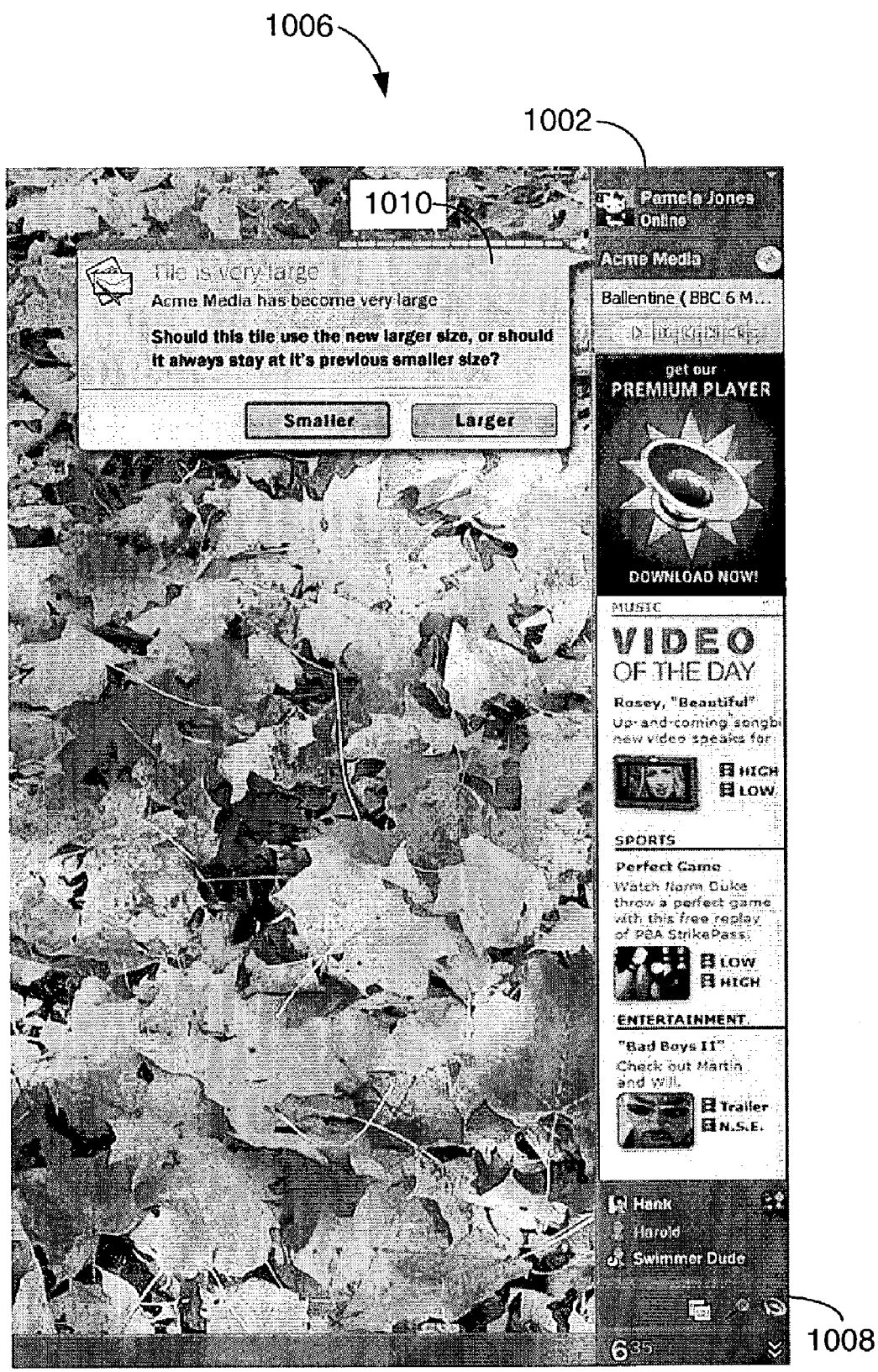
FIG. 10B illustrates the sidebar of FIG. 10A with one of the tiles having been resized.
Figure 11A:
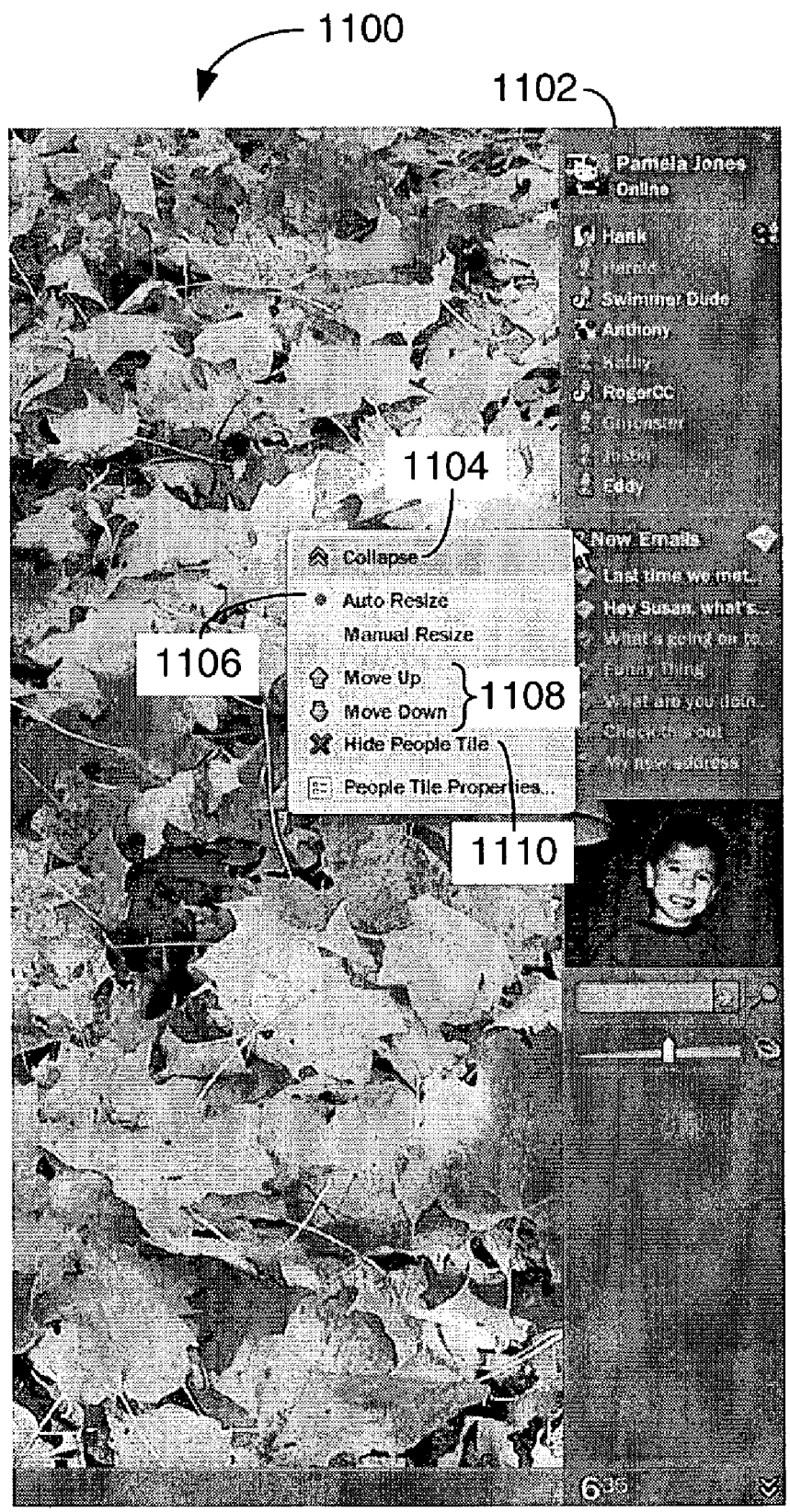
FIG. 11A illustrates a sidebar along with an exemplary menu of options that may be available to a user for customizing the sidebar.
Figure 11B:
FIG. 11B illustrates a sidebar across the bottom of a display in one customized configuration.
Figure 11C:
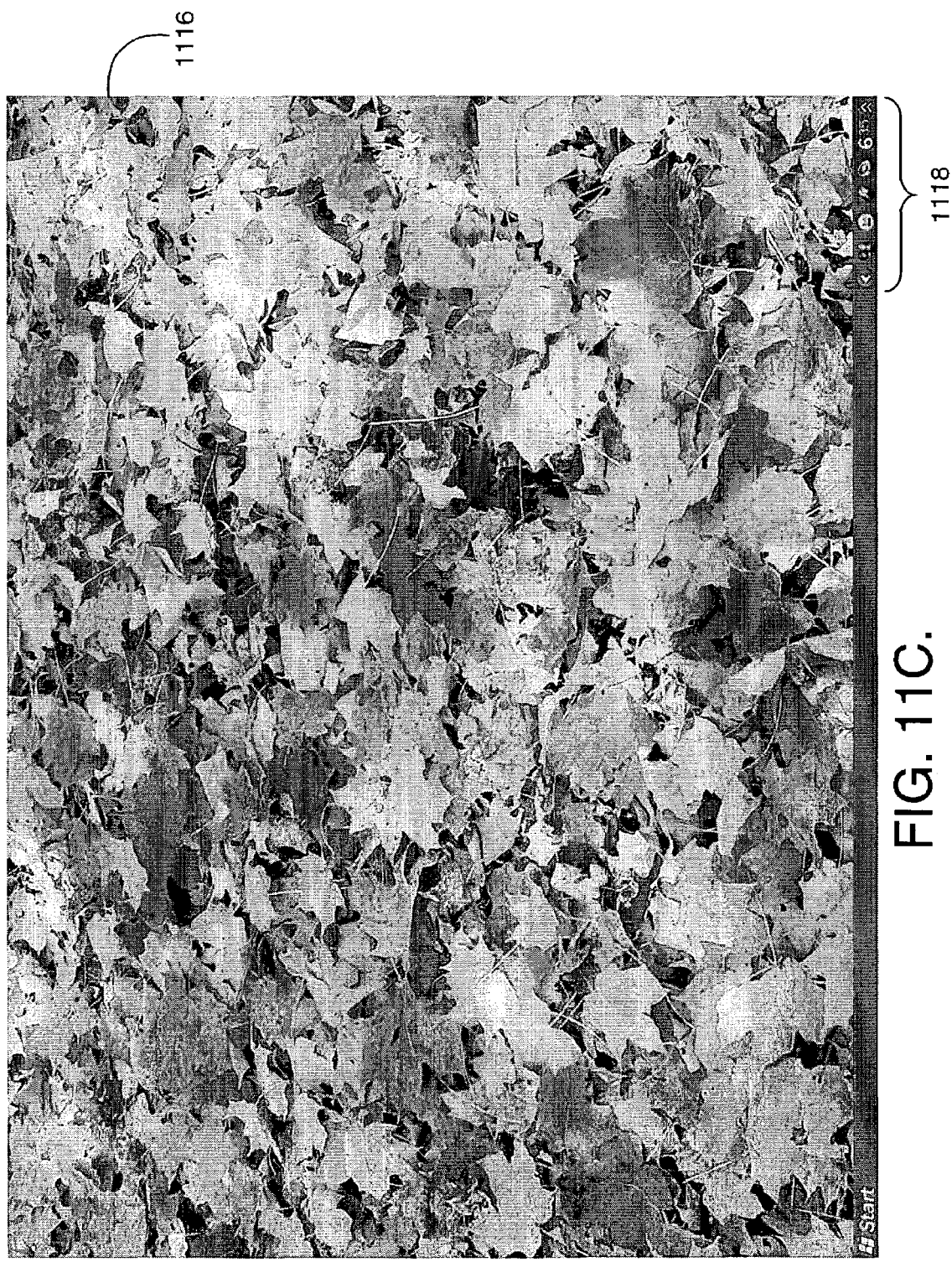
FIG. 11C illustrates a sidebar reduced to icons in a second customized configuration.

Turning initially to display 1000 of FIG. 10A, a sidebar 1002 is shown. An 'ACME Media' tile 1004 is shown in the third position from the top of the sidebar 1002 and is immediately followed by an individual contact tile 1004, which is followed by several other tiles. Through user selection or automated expansion, 'ACME Media' tile 1004 is able to expand. As shown in display 1006 of FIG. 10B, the expansion of 'ACME Media' tile 1004 causes all subsequent tiles within the sidebar 1002 to shift down. As previously explained once the shifting of tiles extends beyond the designated area for the sidebar 1002, tiles are moved into the overflow area 1008. In conjunction with the tile expansion, a user is given an opportunity via a prompt to decide if the tile should remain in the expanded state or be returned to the smaller size. Such an illustrative prompt 1010 is shown in display 1006.

Another aspect of the present invention is directed to customizing the sidebar. A user can control how the sidebar and tiles are displayed. More particularly, a user may rearrange or resize tiles, relocate the sidebar on the screen, and minimize the sidebar while keeping access to the tiles. Those skilled in the art will appreciate that there are several options which are typical to customizing a user interface, such options are contemplated and are within the scope of the present invention. Examples of some available options are illustrated in display 1100 of FIG. 11A. As shown, a user may select one of many custom options for any tile within the sidebar 1102. For example, a user may collapse the tile by use of option 1104, enable automatic or manual resizing with option 1106, relocate the tile up or down relative to the other tiles in the sidebar with option 1108, or simply hide the tile using option 1110.

A user may relocate the sidebar on the display screen. An example of such relocation is shown in display 1112 of FIG. 11B. As shown, the 'sidebar' 1114 is relocated to the bottom portion of the screen with tiles laid out one next to the other, as opposed to above or below each other. One skilled in the art will appreciate that the sidebar could be relocated to other edges of the screen, have different orientation of the tiles or be located some distance from the edge of the screen.

Yet another custom feature provided by the system and method of the present invention is the option of having the sidebar minimized while still providing access to the tiles that were contained within the sidebar. For example, as shown in display 1116 of FIG. 11C, the sidebar 1102 of FIG. 11A has been minimized. However, returning to FIG. 11C, a group of icons 1118 are shown in the bottom right corner of the display. From these icons 1118, a user can access the tiles that were shown in sidebar 1102 of FIG. 11A.

Figure 12:
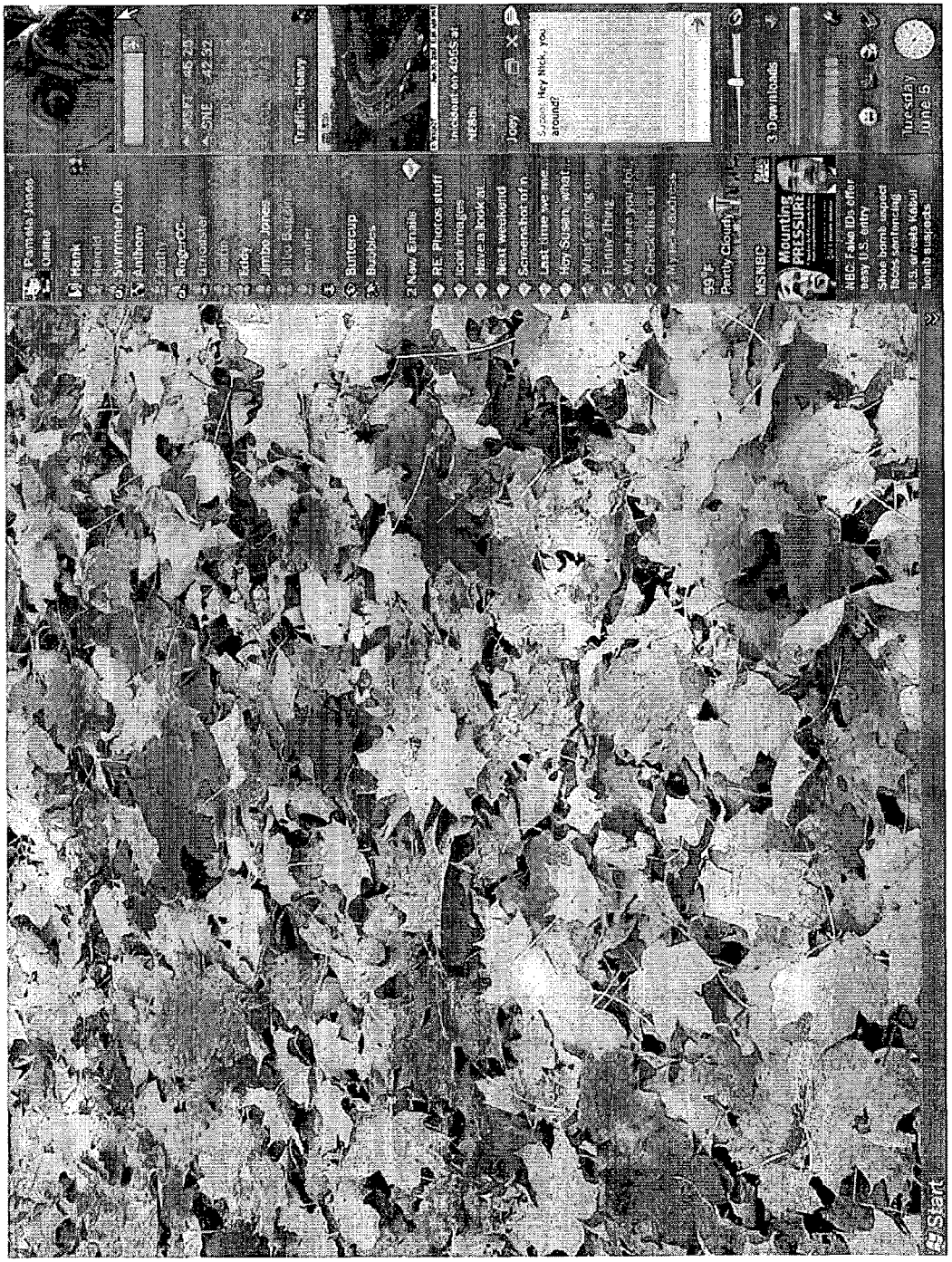
FIG. 12 illustrates a multi-column sidebar.

In another feature of the present invention, there could be multiple columns to a sidebar as can best be seen in FIG. 12. In such an instance, tiles snake from one column to another either left to right or vice-versa before being removed into the overflow area. The column from which the tiles will be shifted into the overflow area is the column that gets squished to provide a preview of an added tile. Within the present invention, there could also be multiple sidebars on one display screen or across several display screens.

A further aspect of the present invention provides for 'pinning' of tiles. Certain tiles can be pinned or fixedly located in a particular position in the sidebar. The effect of this is that new tiles are added around the pinned tile i.e. new tiles are added above or below the pinned tile as the case may be. In other words, the pinned tiles are not likely to get moved into the overflow area.

In the preferred embodiment of the present invention, sidebars as well as tiles are created by utilizing application program interface (API) routines provided by the vendor of the operating system or other third parties. In the described examples of the preferred embodiment, the operating system environment is Microsoft Windows. As would be understood by those skilled in the art, the system and method of the present invention could be implemented within other tools and other operating environments without departing from the scope contemplated herein. Examples of tools in which the present invention can be practiced include Direct X and Macromedia.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set for above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method in a computing system for a user interaction scheme, comprising:
   configuring a sidebar of a predetermined display size to provide dynamic content that is updated automatically;
   hosting a first group of tiles within the sidebar to display at least part of the dynamic content;
   in response to an automatic update of the dynamic content, providing for the addition of one or more tiles to said sidebar to display additional content produced by the update, resulting in a second group of tiles;
   determining a total display area of the second group of tiles based on default tile sizes;
   determining an available display area of the sidebar based on the predetermined display size;
   comparing the total display area to the available display area; and
   when the comparison indicates that the total display area exceeds the available display area, performing the following:
   shrinking said second group of tiles to fit within said sidebar; and
   automatically removing one or more tiles from the second group of tiles in said sidebar so that a remainder of tiles in the second group of tiles is displayable at respective default tile sizes in said sidebar while maintaining the sidebar at the predetermined display size,
   wherein the second group of tiles is displayed in a shrunken state prior to the automatic removal of the one or more tiles.

2. A method as recited in claim 1, wherein said shrinking is a scaling of said second group of tiles.

3. A method as recited in claim 1, further comprising:
   expanding the remainder of tiles of the second group of tiles to the default size after the one or more tiles have been removed.

4. A method as recited in claim 1, wherein said automatic removal of said one or more tiles is performed by one or more application programs.

5. A method as recited in claim 1, further comprising identifying the one or more tiles to remove from the second group of tiles is performed based on one or more criteria.

6. A method as recited in claim 5, wherein said one or more criteria is one from the group consisting of available space in said sidebar, default tile size, and tile priority.

7. A method as recited in claim 1 further comprising providing an overflow area within said sidebar for displaying icons representing the removed one or more tiles.

8. A method as recited in claim 7 wherein the one or more removed tiles are converted to icons that are placed into said overflow area.

9. The method of claim 8, wherein each displayed icon represents a respective one of the bumped one or more tiles, and wherein each displayed icon includes visible indicia of the respective bumped tile.

10. A method as recited in claim 7, wherein said overflow area has multiple rows of icons.

11. A method as recited in claim 7, wherein said overflow area expands in accordance with an amount of needed space to display said removed one or more tiles.

12. The method of claim 7, wherein
a plurality of tiles are removed, a plurality of icons being displayed in the overflow area to represent the removed icons,
wherein each displayed icon includes visible indicia representing a corresponding one of the removed tiles.

13. A method as recited in claim 1, wherein said first group of tiles do not overlap one another and are variable in size.

14. A method as recited in claim 1, wherein said removed one or more tiles are placed into a second sidebar.

15. A method as recited in claim 1, wherein said sidebar comprises multiple columns, the method further comprising moving one or more tiles from the second group of tiles into another column of said sidebar.

16. A method as recited in claim 1, wherein each of the second group of tiles displayed in their shrunken state is interactive.

17. A method as recited in claim 1, wherein said shrinking maintains the aspect ratio of each of said second group of tiles.

18. A method as recited in claim 1, wherein said shrinking is a continuous transition from full scale to a shrunken state.

19. A method as recited in claim 1, wherein the content of said sidebar dynamically adjusts in response to the addition, expansion, shrinking or removal of tiles.

20. The method of claim 1, wherein the sidebar is configured to automatically update the dynamic content to provide additional content associated with the installation of an application program.

21. A method in a computing environment for providing information to a user, comprising:
configuring a sidebar of a predetermined display size to provide dynamic content that is updated automatically;
providing a plurality of tiles in a first region of the sidebar to display at least part of the dynamic content;
providing an overflow area in a second region of the sidebar different from the first region;
in response to an automatic update of the dynamic content, creating an additional tile for displaying additional content resulting from the update;
determining a total display area of the plurality of tiles including the additional tile;
determining an available display area of the sidebar based on the predetermined display size;
comparing the total display area to the available display area;
when the comparison indicates that the total display size exceeds the available display area, performing the following:
automatically shrinking the plurality of tiles including the additional tile to fit within the sidebar;
automatically bumping one or more of the shrunken tiles from the sidebar in order to display the remaining tiles in the sidebar at respective default tile sizes while maintaining the sidebar at the predetermined display size; and
populating said overflow area with icons that represent the one or more tiles that have been bumped from said sidebar, said overflow area displaying said icons without user interaction.

22. A method as recited in claim 21, wherein prior to bumping said one or more tiles from said sidebar, said plurality of tiles are squished within said sidebar to notify a user that one or more tiles will be bumped from said sidebar.

23. A method as recited in claim 22, wherein said squished tiles are useable as displayed and are not just bit image pictures.

24. A method as recited in claim 22, wherein aspect ratio of tiles are maintained when said tiles are squished.

25. A method as recited in claim 22, wherein there is a continuous transition from full scale to said squished state.

26. A method as recited in claim 21, wherein prior to being bumped from the sidebar, said one or more tiles flash to provide visual notification to a user.

27. A method as recited in claim 21, wherein said one or more tiles get bumped due to an addition of a new tile, and said addition is performed automatically by an application program.

28. A method as recited in claim 21, wherein said one or more tiles get bumped due to an addition of a new tile, and said addition is performed manually by user request.

29. A method as recited in claim 21, wherein said one or more tiles that get bumped are selected according to at least one of default tile size and tile priority.

30. A method as recited in claim 21, wherein said plurality of tiles are not overlapping and can be varied in dimension to accommodate the addition of other tiles.

31. A method as recited in claim 21, wherein said overflow area has multiple rows of icons.

32. A method as recited in claim 21, wherein said overflow area can grow dynamically as needed.

33. The method of claim 21, wherein the sidebar is configured to automatically update the dynamic content to provide additional content associated with the installation of an application program.

34. A computer readable storage medium having computer executable instructions for performing a method in a computing system for a user interaction scheme, comprising:
configuring a sidebar of a predetermined display size to provide dynamic content that is updated automatically;
hosting a first group of tiles within the sidebar to display at least part of the dynamic content;
in response to an automatic update of the dynamic content, providing for the addition of one or more tiles to said sidebar to display additional content produced by the update, resulting in a second group of tiles;
determining a total display area of the second group of tiles based on default tile sizes;
determining an available display area of the sidebar based on the predetermined display size;
comparing the total display area to the available display area; and
when the comparison indicates that the total display area exceeds the available display area, performing the following:
shrinking said second group of tiles to fit within said sidebar; and automatically removing, by the computing system, one or more tiles from the second group of tiles in said sidebar so that a remainder of tiles of the second group of tiles is displayable at respective default tile sizes while maintaining the sidebar at the predetermined display size, wherein the second group of tiles is displayed in a shrunken state in the sidebar prior to the one or more tiles being automatically removed.

35. The computer readable medium of claim 34, wherein said shrinking is a scaling of said second group of tiles.

36. The computer readable medium of claim 34, further comprising:

expanding the remainder of tiles of the second group of tiles to the default size after the one or more tiles have been removed.

37. The computer readable medium of claim 36, wherein a plurality of tiles are removed, the method further comprising providing an overflow area within said sidebar for displaying icons representing the removed tiles, each displayed icon having visual indicia of a corresponding one of the removed tiles.

38. The computer readable medium of claim 37 wherein the removed one or more tiles are converted to icons that are placed into said overflow area.

39. The computer readable medium of claim 37, wherein said overflow area has multiple rows of icons.

40. The computer readable medium of claim 37, wherein said overflow area expands in accordance with an amount of needed space to display said removed one or more tiles.

41. The computer readable medium of claim 36, wherein said removed one or more tiles are placed into a second sidebar.

42. The computer readable medium of claim 36, wherein said sidebar comprises multiple columns, further comprising computer executable instructions for moving one or more tiles from said second group of tiles into another column of said sidebar.

43. The computer readable medium of claim 34, wherein said removal of said one or more tiles is performed automatically by one or more application programs.

44. The computer readable medium of claim 34, wherein identifying one or more tiles to remove from the second group of tiles is performed based on one or more criteria.

45. The computer readable medium of claim 44, wherein said one or more criteria includes at least one of default tile size and tile priority.

46. The computer readable medium of claim 34, wherein said first group of tiles are not overlapping and can be varied in dimension to accommodate the addition of other tiles.

47. The computer readable medium of claim 34, wherein each of the second group of tiles displayed in their shrunken state is interactive.

48. The computer readable medium of claim 34, wherein said shrinking maintains the aspect ratio of each of the second group of tiles.

49. The computer readable medium of claim 34, wherein said shrinking is a continuous transition from full scale to the shrunken state.

50. The computer readable medium of claim 34, wherein said sidebar can be customized by a user.

51. A system for providing user access to a variety of informational items, comprising:

a sidebar having a predetermined display size and configured to provide dynamic content that is updated automatically;

a plurality of tiles to display at least part of the dynamic content; and an overflow area, wherein said sidebar contains a first region and a second region, the first region configured to display said plurality of tiles and the second region configured to include said overflow area;

wherein, in response to an automatic update of the dynamic content, an additional tile is created for displaying additional content resulting from the update, a total display area is determined for the plurality of tiles including the additional tile based on default tile sizes, an available display area of the sidebar is determined based on the predetermined display size, the total display area is compared to the available display area, and when the comparison indicates that the total display area exceeds the available display area, the plurality of tiles including the additional tiles are shrunk to fit in the sidebar, and one of more of the shrunken tiles are automatically removed from the first region to provide sufficient space in the first region to display the remaining tiles in respective default tile sizes while maintaining the sidebar at the predetermined display size;

wherein one or more icons are placed in said overflow area to represent the one or more automatically removed tiles; and wherein the one or more icons placed in said overflow area are visible without user interaction.

52. A system as recited in claim 51, wherein prior to placing the one or more icons in said overflow area, said plurality of tiles are squished within said sidebar to notify a user that the removed one or more tiles will be removed from said sidebar.

53. A system as recited in claim 51, wherein prior to being removed from the sidebar, said one or more tiles flash to provide visual notification to a user.

54. A system as recited in claim 51, wherein said one or more tiles are removed due to an addition of a new tile, and said addition is performed automatically by an application program.

55. A system as recited in claim 51, wherein said one or more tiles are removed due to an addition of a new tile, and said addition is performed manually by user request.

56. A system as recited in claim 51, wherein said one or more tiles that get removed are selected according to one or more criteria one from the group consisting of position within said sidebar, default tile size, and tile priority.

57. A computing system having computer executable instructions for performing a method for a user interaction scheme, the method comprising:

configuring a sidebar of a predetermined display size to provide dynamic content that is automatically updated;

hosting a first group of tiles within the sidebar to display at least part of the dynamic content;

in response to an automatic update of the dynamic content, providing for the addition of one or more tiles to sidebar for displaying additional content produced by the update, resulting in a second group of tiles;

determining a total display area of the second group of tiles based on default tile sizes;

determining an available display area of the sidebar based on the predetermined display size;

comparing the total display area to the available display area; and when the comparison indicates that the total display area exceeds the available display area, performing the following:

shrinking said second group of tiles to fit within said sidebar; and automatically removing, by the computing system, one or more tiles from the second group of tiles in said sidebar so that a remainder of tiles in the second group of tiles is displayable at respective default sizes while maintaining the sidebar at the predetermined display size, wherein the second group of tiles is displayed in the sidebar in a shrunken state prior to the automatic removal of the one or more tiles.

58. A user interface stored on a computer readable medium and executable on a computer, comprising:

a sidebar area providing dynamic content, the sidebar area having a first region and a second region, wherein the first region is configured to display one or more tiles to display at least part of the dynamic content, wherein, in response to an automatic update of the dynamic content, a tile is added to the first region, and the tiles in the first region are displayed in a shrunken state to fit within the sidebar, wherein one or more of the shrunken tiles are automatically removed from the first region to provide sufficient space in the first region to display the remaining tiles in respective default sizes while maintaining the sidebar at a predetermined display size, wherein the second region includes an overflow area displaying a plurality of icons each representing a respective one of the one or more tiles automatically removed from said first region, wherein each of the plurality of icons includes indicia of its respective tile, the indicia being visible in the overflow area without user interaction, and wherein the sidebar is displayed at a predetermined display size before the automatic removal of the one or more tiles.

59. A computer-implemented method for execution in a graphical user interface environment for user interaction, comprising:

displaying a sidebar of a predetermined display size to provide dynamic content;

presenting on the graphical user interface a first group of tiles within the sidebar;

in response to an automatic update of the dynamic content, providing for the addition of one or more tiles to said sidebar, resulting in a second group of tiles;

shrinking said second group of tiles to fit within said sidebar if there is insufficient display area within said sidebar for said second group of tiles to be displayed in a default size while maintaining the sidebar at the predetermined display size;

presenting on the graphical user interface an overflow area in the sidebar configured to display one or more icons each representing a respective one of one or more tiles automatically removed from said sidebar, wherein the second group of tiles is displayed in a shrunken state in the sidebar prior to the one or more tiles being automatically removed from the sidebar, wherein a remainder of the second group of tiles not removed from the sidebar are expanded to a default size subsequent to the one or more tiles being automatically removed, and wherein each of the one or more icons includes indicia of its respective tile, the indicia being visible in the sidebar without user interaction.

* * * * *